(12) United States Patent
Little et al.

(10) Patent No.: US 8,010,954 B2
(45) Date of Patent: Aug. 30, 2011

(54) PARALLEL PROGRAMMING INTERFACE TO DYNAMICALLY ALLOCATE PROGRAM PORTIONS

(75) Inventors: John N. Little, Sherborn, MA (US); Joseph F. Hicklin, Upton, MA (US); Jocelyn Luke Martin, Burwell (GB); Nausheen B. Moulana, Framingham, MA (US); Halldor N. Stefansson, Natick, MA (US); Loren Dean, Natick, MA (US); Roy E. Lurie, Wayland, MA (US); Stephen C. Johnson, Sudbury, MA (US); Penelope L. Anderson, Newton, MA (US); Michael E. Karr, Brookline, MA (US); Jason A. Kinchen, Winchester, MA (US)

(73) Assignee: The MathWorks, Inc., Natick, MA (US)

( * ) Notice: Subject to any disclaimer, the term of this patent is extended or adjusted under 35 U.S.C. 154(b) by 1129 days.

(21) Appl. No.: 11/748,938

(22) Filed: May 15, 2007

(65) Prior Publication Data

US 2008/0201721 A1    Aug. 21, 2008

Related U.S. Application Data

(63) Continuation-in-part of application No. 11/706,805, filed on Feb. 14, 2007.

(51) Int. Cl.
 *G06F 9/45* (2006.01)
 *G06F 9/445* (2006.01)
(52) U.S. Cl. .................. 717/149; 717/148; 717/151
(58) Field of Classification Search .......... 717/127–129, 717/140–143, 148–155
See application file for complete search history.

(56) References Cited

U.S. PATENT DOCUMENTS

| | | | | |
|---|---|---|---|---|
| 5,355,492 A * | 10/1994 | Frankel et al. | ................ | 717/151 |
| 5,485,612 A * | 1/1996 | Ota et al. | ..................... | 718/100 |
| 5,535,393 A * | 7/1996 | Reeve et al. | .................. | 717/149 |
| 5,586,325 A * | 12/1996 | MacDonald et al. | ......... | 717/153 |
| 5,721,928 A * | 2/1998 | Umehara et al. | .............. | 717/149 |
| 5,768,594 A * | 6/1998 | Blelloch et al. | ............... | 717/149 |
| 6,106,575 A * | 8/2000 | Hardwick | ..................... | 717/119 |
| 6,665,862 B2 * | 12/2003 | Isman | ............................ | 717/127 |
| 6,725,448 B1 * | 4/2004 | Moriya et al. | ................ | 717/119 |
| 6,829,760 B1 * | 12/2004 | Bera | ............................. | 717/142 |
| 6,865,730 B1 * | 3/2005 | Burke et al. | .................. | 717/116 |
| 6,961,925 B2 * | 11/2005 | Callahan et al. | .............. | 717/128 |

(Continued)

FOREIGN PATENT DOCUMENTS

WO    WO 93/15457    8/1993

(Continued)

OTHER PUBLICATIONS

Ismail et al, "Program based static allocation policies fro highly parallel computers", IEEE, pp. 61-68, 1995.*

(Continued)

*Primary Examiner* — Anil Khatri

(74) *Attorney, Agent, or Firm* — Harrity & Harrity, LLP

(57) ABSTRACT

A computing device-implemented method includes receiving a program created by a technical computing environment, analyzing the program, generating multiple program portions based on the analysis of the program, dynamically allocating the multiple program portions to multiple software units of execution for parallel programming, receiving multiple results associated with the multiple program portions from the multiple software units of execution, and providing the multiple results or a single result to the program.

31 Claims, 19 Drawing Sheets

U.S. PATENT DOCUMENTS

| | | | |
|---|---|---|---|
| 7,127,709 B2 * | 10/2006 | Demsey et al. | 717/148 |
| 7,174,381 B2 * | 2/2007 | Gulko et al. | 709/226 |
| 7,254,806 B1 * | 8/2007 | Yates et al. | 717/136 |
| 7,305,666 B2 * | 12/2007 | Burger et al. | 717/140 |
| 7,313,788 B2 * | 12/2007 | Ben-David et al. | 717/150 |
| 7,475,393 B2 * | 1/2009 | Essick et al. | 717/151 |
| 7,493,606 B2 * | 2/2009 | Morin | 717/149 |
| 7,770,161 B2 * | 8/2010 | Mitran et al. | 717/151 |
| 7,849,451 B2 * | 12/2010 | Palacz et al. | 717/148 |
| 7,853,937 B2 * | 12/2010 | Janczewski | 717/149 |
| 2002/0078125 A1 | 6/2002 | Ichinose et al. | |
| 2004/0243709 A1 | 12/2004 | Kalyanavarathan et al. | |

FOREIGN PATENT DOCUMENTS

| | | |
|---|---|---|
| WO | WO 2006/032001 A2 | 3/2006 |
| WO | WO 2006/088669 A1 | 8/2006 |
| WO | WO 2007/016658 A1 | 2/2007 |

OTHER PUBLICATIONS

Kejariwal et al, "On the exploitation of loop level parallelism in embedded applications", ACM Trans. on embedded computing systems, vol. 8, No. 2, article 10, pp. 1-34, 2009.*

Massen et al, "Efficient Java RMI for parallel programming", ACM Trans. on Prog. Lang. and Sys. vol. 23, No. 6, pp. 747-775, 2001.*

Nieuwpoort et al, "Satin: A high level and efficient grid programming model", ACM Trans. Prog. Lang. and Sys. vol. 32, No. 3, article 9, pp. 1-39, 2010.*

Norris et al, "An experimental study of several cooperative register allocation and instruction scheduling strategies", IEEE, pp. 169-179, 1995.*

International Search Report and Written Opinion mailed Aug. 25, 2008 issued in corresponding international application No. PCT/US2008/062162, 14 pages.

Behboodian, A. et al.: The Mathworks Distributed and Parallel Computing Tools for Signal Processing Applications; IEEE International Conference on Acoustics, Speech and Signal Processing, vol. IV, Apr. 2007, pp. 1185-1188.

Bartz, D. et al.: Rendering and Visualization in Parallel Environments; IEEE Visualization 2001 tutorial 3, 51 pages.

Chen, Y. et al.: MATLAB*G: A Grid-Based Parallel MATLAB; http://ntu-cg.ntu.edu.sg/Grid_competition/report/grid-9.pdf, print date Apr. 6, 2006, 6 pages.

Choy, R. et al.: Parallel MATLAB: Doing it Right; Proceedings of IEEE, vol. 93, No. 2, Feb. 2005, 11 pages.

Travinin, N. et al.: pMapper: Automatic Mapping of Parallel Matlab Programs; Proceedings of the Users Group Conference 2005, 8 pages.

Xue, G. et al.: Implementation of a Grid Computation Toolkit for Design Optimisation with Matlab and Condor; Lecture Notes in Computer Science: Euro-Par 2003 Parallel Processing, vol. 2790, 2003, 9 pages.

* cited by examiner

PARALLEL PROGRAMMING INTERFACE TO DYNAMICALLY ALLOCATE PROGRAM PORTIONS

RELATED APPLICATION

This application is a continuation-in-part of U.S. patent application Ser. No. 11/706,805 filed, Feb. 14, 2007, the entire content of which is hereby incorporated by reference.

BACKGROUND

Closely-coupled processors or hardware resources will become widely available within the near future. Examples of such closely-coupled processors (or hardware resources) may include additional processors, threads in a particular processor, additional cores in a central processing unit, additional processors mounted on the same substrate or board, and/or such devices provided within computers connected by a network fabric into a cluster, a grid, or a collection of resources.

Certain computations (e.g., parallel processing or parallel programming) may benefit from the availability of such hardware resources. For example, a complex simulation may run faster if the simulation is divided into portions and the portions are simultaneously run on a number of processing devices in a parallel fashion. Parallel computing arrangements may include a controller that determines how an application should be divided and what application portions go to which parallel processors. For example, a host computer that is running a simulation may act as the controller for a number of parallel processors.

Parallel processors may receive instructions and/or data from the controller and may return a result to the controller. Conventional parallel programming language constructs do not nest or, if they can nest, provide an outermost construct with complete control of the allocation of hardware resources while executing inner constructs serially. Such an "outermost" strategy may degrade the performance of library routines executing such parallel constructs, without yielding corresponding benefits.

Conventional parallel programming environments either provide a very flexible framework or a restricted framework. The flexible framework allows a user to perform a variety of parallel programming actions, but such flexibility increases the probability of committing errors. The restricted framework does not allow the user to perform sufficient parallel programming actions. Examples of conventional attempts at parallel programming may include a distributed operating system (OS), an open MOSIX (a management system for Linux clusters and organizational grids), and/or Java™ threads. However, a distributed OS fails to provide dynamic, cross-platform, and interactive parallel programming. An open MOSIX may enable a user to migrate execution threads across multiple devices, but cannot appropriately deal with mode changes caused by parallel programming. Java™ threads are similar to an open MOSIX, but do not provide a parallel programming environment. Rather, Java™ threads represent just a building block towards a parallel programming environment.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
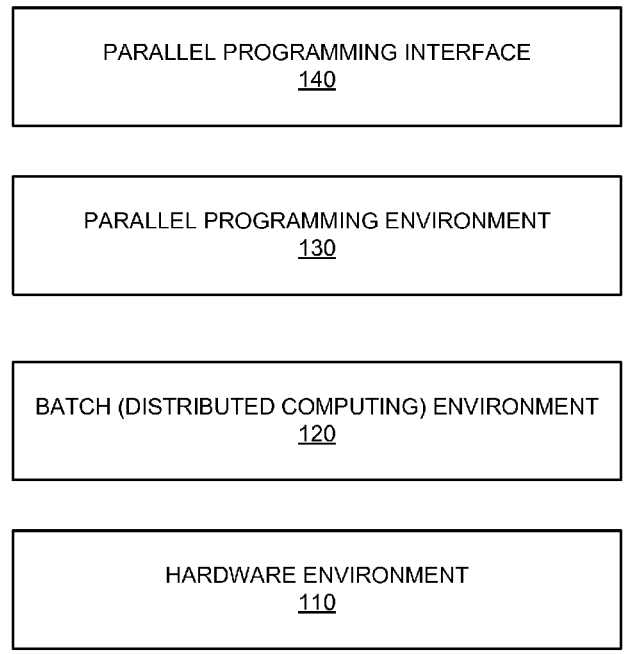
FIG. 1 is an exemplary diagram of an architectural overview in which implementations described herein may be practiced.

The following detailed description refers to the accompanying drawings. The same reference numbers in different drawings may identify the same or similar elements. Also, the following detailed description does not limit the invention.

Overview

Implementations described herein may provide a parallel programming interface for a program for execution. For example, in one implementation, the parallel programming interface may analyze the program, may generate one or more program portions based on the analysis of the program, and/or may specify a behavior of a segment and/or all of the one or more portions. The parallel programming interface may dynamically allocate the one or more portions to one or more software units of execution (UEs), and/or may forward the one or more software UEs to one or more hardware UEs for execution. The parallel programming interface may receive one or more results associated with the one or more portions from the software UEs, and may provide the one or more results to the program.

A "hardware unit of execution," as the term is used herein, is to be broadly interpreted to include a device (e.g., a hardware resource) that performs and/or participates in parallel programming activities. For example, a hardware unit of execution may perform and/or participate in parallel programming activities in response to a request and/or a task received from a client. A hardware unit of execution may perform and/or participate in substantially any type of parallel programming (e.g., task, data, and/or stream processing) using one or more devices. For example, in one implementation, a hardware unit of execution may include a single processing device that includes multiple cores and in another implementation, the hardware unit of execution may include a number of processors. Devices used in a hardware unit of execution may be arranged in substantially any configuration (or topology), such as a grid, ring, star, etc. A hardware unit of execution may support one or more threads (or processes) when performing processing operations.

A "software unit of execution," as the term is used herein, is to be broadly interpreted to include a software resource (e.g., a worker, a lab, etc.) that performs and/or participates in parallel programming activities. For example, a software unit of execution may perform and/or participate in parallel programming activities in response to a receipt of a program and/or one or more portions of the program. A software unit of execution may perform and/or participate in substantially any type of parallel programming using one or more hardware units of execution. A software unit of execution may support one or more threads (or processes) when performing processing operations.

"Parallel programming," as the term is used herein, is to be broadly interpreted to include any type of processing that can be distributed across two or more resources (e.g., software units of execution, hardware units of execution, processors, microprocessors, clusters, labs, etc.) and be performed at substantially the same time. For example, in one implementation, parallel programming may refer to task parallel programming where a number of tasks are processed at substantially the same time on a number of software units of execution. In task parallel programming, each task may be processed independently of other tasks executing at the same time (e.g., a first software unit of execution executing a first task may not communicate with a second software unit of execution executing a second task). In another implementation, parallel programming may refer to data parallel programming, where data (e.g., a data set) is parsed into a number of portions that are executed in parallel using two or more software units of execution. In data parallel programming, the software units of execution and/or the data portions may communicate with each other as processing progresses. In still another implementation, parallel programming may refer to stream parallel programming (also referred to as pipeline parallel programming). Stream parallel programming may use a number of software units of execution arranged in series (e.g., a line) where a first software unit of execution produces a first result that is fed to a second software unit of execution that produces a second result. Stream parallel programming may also include a state where task allocation may be expressed in a directed acyclic graph (DAG) or a cyclic graph with delays). Other implementations may combine two or more of task, data, or stream parallel programming techniques alone or with other types of processing techniques to form hybrid-parallel programming techniques.

A "parallel programming environment," as the term is used herein, is to be broadly interpreted to include any environment capable of performing parallel programming. For example, a parallel programming environment may include a dynamic number of processes provided on one or more hardware and/or software units of execution which may have several different control and data passing layers through which a current behavior of a part or a whole of the environment may be specified. In one implementation, a front-end application (e.g., a parallel programming interface) may interface with the parallel programming environment to provide one or more users with access to the parallel programming environment. In another implementation, the processes involved in the parallel programming environment may include processes associated with a technical computing environment.

A "technical computing environment (TCE)," as the term is used herein, is to be broadly interpreted to include any hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, a TCE may include a dynamically-typed programming language (e.g., the M language) that can be used to express problems and/or solutions in mathematical notations. For example, a TCE may use an array as a basic element, where the array may not require dimensioning. In addition, a TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

A TCE may further provide mathematical functions and/or graphical tools (e.g., for creating plots, surfaces, images, volumetric representations, etc.). In one implementation, a TCE may provide these functions and/or tools using toolboxes (e.g., toolboxes for signal processing, image processing, data plotting, parallel programming, etc.). In another implementation, a TCE may provide these functions as block sets. In still another implementation, a TCE may provide these functions in another way, such as via a library, etc.

A TCE may be implemented as a text-based environment (e.g., MATLAB®; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

Exemplary Architectural Overview

FIG. 1 is an exemplary diagram of an architectural overview 100 in which implementations described herein may be practiced. As illustrated, overview 100 may include a hardware environment 110, a batch (or distributed computing) environment 120, a parallel programming environment 130, and/or a parallel programming interface 140.

Hardware environment 110 may include one or more hardware resources that may be used to perform parallel programming. For example, in one implementation, hardware environment 110 may include one or more hardware units of execution. Further details of hardware environment 110 are provided below in connection with FIG. 2.

Batch environment 120 may provided a distributed computing environment for a job. For example, in one implementation, batch (or distributed computing) environment 120 may include a client that provides a job to a scheduler. The scheduler may distribute the job into one or more tasks, and may provide the tasks to one or more hardware units of execution and/or one or more processors. The hardware units of execution and/or processors may execute the tasks, and may provide results to the scheduler. The scheduler may combine the results into a single result, and may provide the single result to the client. Further details of batch environment 120 are provided below in connection with FIG. 3.

Parallel programming environment 130 may provide parallel programming for a main program. For example, in one implementation, parallel programming environment 130 may include a technical computing environment that provides a main program to a controller. The controller may provide portions of the program to one or more software units of execution and/or one more labs. The software units of execution and/or labs may execute the program portions, and may provide results to the controller. The controller may combine the results into a single result, and may provide the single result to the technical computing environment. Further details of parallel programming environment 130 are provided below in connection with FIG. 4.

Parallel programming interface 140 may include a front-end application (e.g., an application program interface (API)) that provides an interface for dynamically accessing, controlling, utilizing, etc. hardware environment 110, batch environment 120, and/or parallel programming environment 130. For example, in one implementation, parallel programming interface 140 may be in the form of a parallel programming constructs that permit users to express specific parallel workflows. In such an implementation, parallel programming interface 140 may include a program provider that provides a main program to analysis logic. The analysis logic may analyze the main program, may parse the main program into program portions, and may provide the program portions to resource allocation logic. Resource allocation logic may allocate the program portions to one or more software units of execution and/or hardware units of execution. The program portions may be executed, and results may be provided to the program provider. In another implementation, parallel programming interface 140 may include an object API where a user may specify how a program may be parallelized. Further details of parallel processing interface 140 are provided below in connection with FIGS. 5A-5C.

Although FIG. 1 shows exemplary components of architectural overview 100, in other implementations, architectural overview 100 may contain fewer, different, or additional components than depicted in FIG. 1.

Exemplary Hardware Environment

Figure 2:
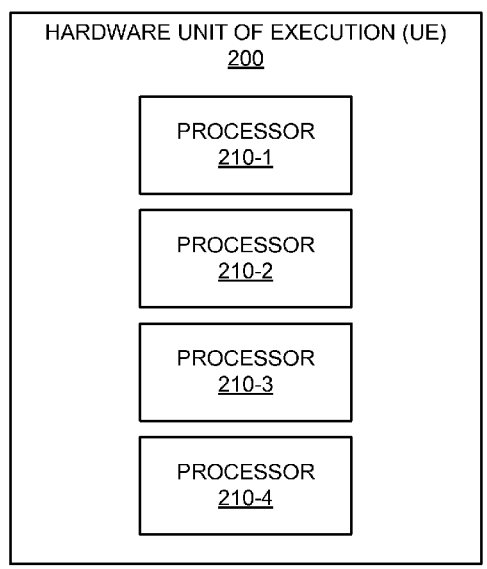
FIG. 2 is an exemplary diagram of a hardware environment depicted in FIG. 1.

FIG. 2 is an exemplary diagram of hardware environment 110. As illustrated, hardware environment 110 may include a hardware unit of execution 200 with one or more processors 210-1, 210-2, 210-3, 210-4 (collectively, "processors 210").

Hardware UE 200 may include a hardware device that performs parallel programming. In one implementation, hardware UE 200 may perform parallel programming activities on behalf of another device. In another implementation, hardware UE 200 may perform parallel programming activities on behalf of itself or on behalf of a host of which hardware UE 200 is a part. Hardware UE 200 may perform parallel programming in a variety of ways. For example, hardware UE 200 may perform parallel programming activities related to task parallel programming, data parallel programming, stream parallel programming, etc. Hardware UE 200 may perform parallel programming using processing devices resident on UE 200 and/or using processing devices that are remote with respect to UE 200.

As further shown in FIG. 2, hardware UE 200 may include processors 210-1, 210-2, 210-3, and 210-4. Processors 210 may include hardware and/or software based logic that performs processing operations. Processors 210 may include substantially any type of processing device, such as a central processing unit (CPU), a microprocessor, a field programmable gate array (FPGA), an application specific integrated circuit (ASIC), a micro electrical mechanical switch (MEMS), a general purpose graphical processing unit (GPGPU), an optical processor, a biologic processor, etc. In one implementation, each processor 210-1 through 210-4 may include a single core processor or a multi-core processor. In another implementation, each processor 210-1 through 210-4 may include a single processing device or a group of processing devices, such as a processor cluster or a computing grid. In still another implementation, each processor 210-1 through 210-4 may include multiple processors that may be local or remote with respect each other, and may use one or more threads while processing. In a further implementation, each processor 210-1 through 210-4 may represent a single hardware UE.

Although FIG. 2 shows exemplary components of hardware environment 110, in other implementations, hardware environment 110 may contain fewer, different, or additional components than depicted in FIG. 2. For example, in one implementation, hardware environment 110 may include one or more of a bus, a processing unit, a main memory, a read-only memory (ROM), a storage device, an input device, an output device, and/or a communication interface. In still other implementations, one or more components of hardware environment 110 may perform the tasks performed by one or more other components of hardware environment 110.

Exemplary Batch Environment

Figure 3:
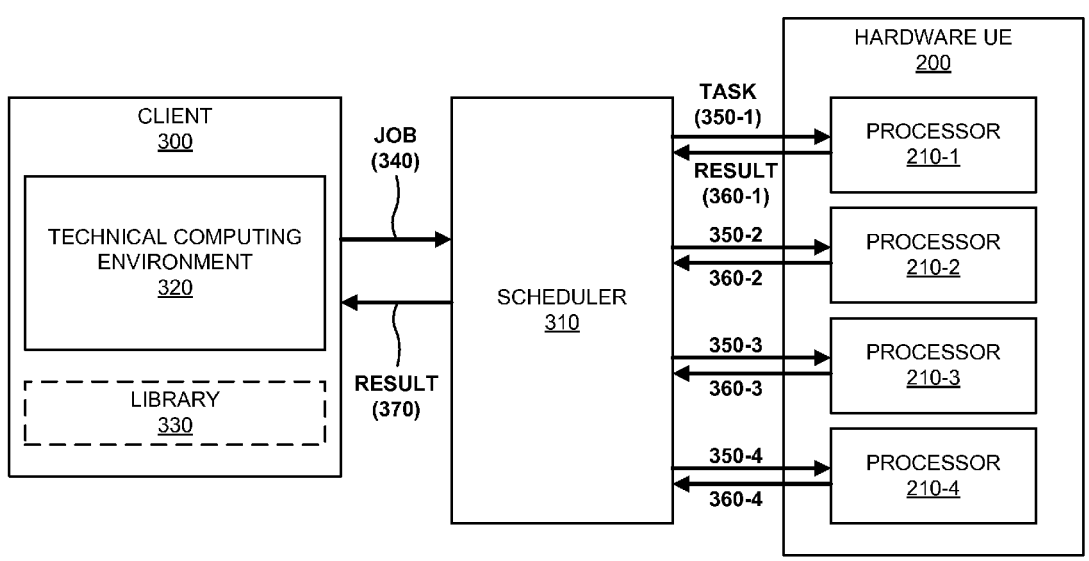
FIG. 3 is an exemplary diagram of a batch (or distributed computing) environment depicted in FIG. 1.

FIG. 3 is an exemplary diagram of batch environment 120. As illustrated, batch environment 120 may include a client 300, a scheduler 310, and hardware UE 200 (including processors 210). Hardware 200 and processors 210 may perform the same or similar tasks as described above in connection with FIG. 2.

Client 300 may include one or more entities. An entity may be defined as a device, such as a personal computer, a personal digital assistant (PDA), a laptop, or another type of computation or communication device, a thread or process running on one of these devices, and/or an object executable by one of these devices. In an exemplary implementation, client 300 may include a device capable of sending information to or receiving information from another device, such as hardware UE 200. As shown in FIG. 3, client 300 may include a technical computing environment (TCE) 320 and a library 330

(optional). Other implementations of client 300 may contain fewer, different, or additional components than depicted in FIG. 3.

Technical computing environment (TCE) 320 may include any of the features described above in the definition of the term "technical computing environment."

Library 330 (optional) may include hardware and/or software based logic that may operate with TCE 320 to perform certain operations. For example, in one implementation, library 330 may include functions to perform certain operations (e.g., signal processing, image processing, parallel programming, data display, etc.) in a text-based environment. In another implementation, library 140 may include graphical representations (e.g., blocks, icons, images, etc.) to perform certain operations in a graphically-based environment (e.g., a gain block, a source block, a filter block, a discrete event generator block, etc.). In still other implementations, library 140 may perform other operations using text, graphics, etc.

Scheduler 310 may include hardware and/or software based logic to perform scheduling operations on behalf of a device. For example, scheduler 310 may perform operations to select and/or control parallel programming activities performed by hardware UE 200 on behalf of client 300. In one implementation, scheduler 310 may receive a job 340, and may distribute or divide job into tasks (e.g., tasks 350-1, 350-2, 350-3, and 350-4). Scheduler 310 may send tasks 350-1, 350-2, 350-3, and 350-4 to hardware UE 200 (e.g., to processor 210-1, 210-2, 210-3, and 210-4, respectively) for execution. Scheduler 310 may receive results from hardware UE 200 (e.g., results 360-1, 360-2, 360-3, and 360-4), may assemble the results into a single result 370, and may provide result 370 to client 300.

Although FIG. 3 shows exemplary components of batch environment 120, in other implementations, batch environment 120 may contain fewer, different, or additional components than depicted in FIG. 3. In still other implementations, one or more components of batch environment 120 may perform the tasks performed by one or more other components of batch environment 120.

Exemplary Parallel Programming Environment

Figure 4:
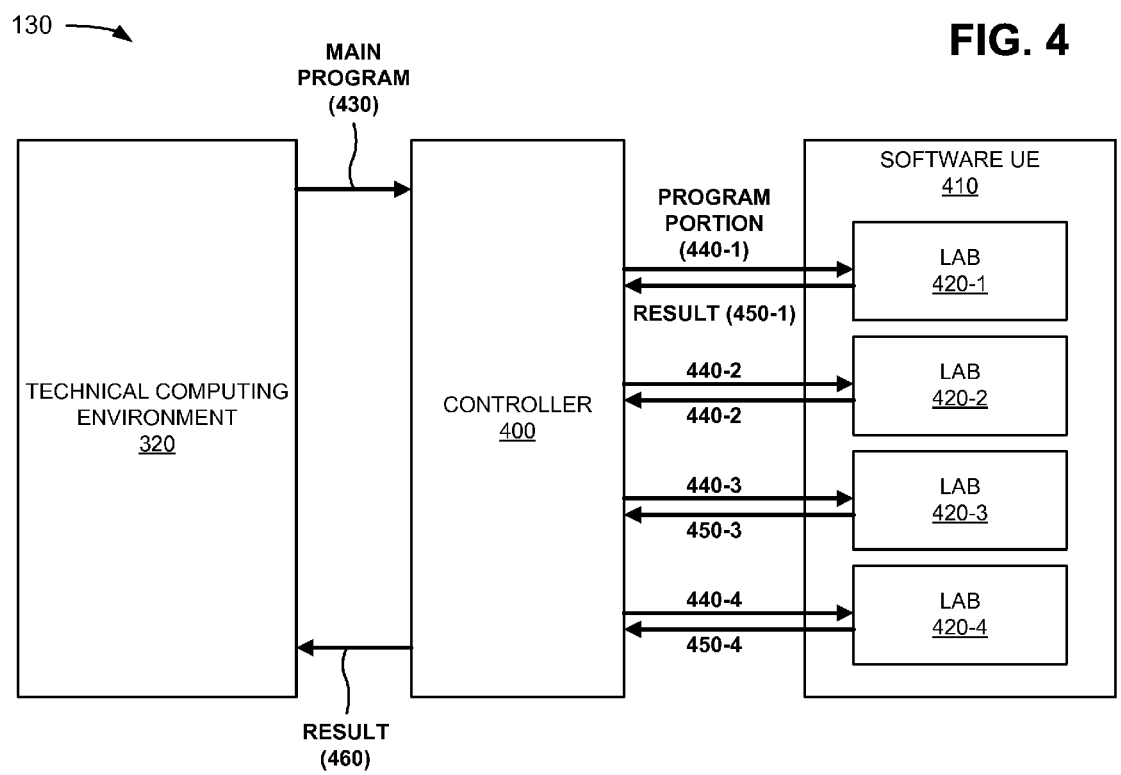
FIG. 4 is an exemplary diagram of a parallel programming environment of FIG. 1.

FIG. 4 is an exemplary diagram of parallel programming environment 130. As illustrated, parallel programming environment 130 may include technical computing environment 320, a controller 400, and a software unit of execution 410. Technical computing environment 320 may include any of the features described above in the definition of the term "technical computing environment."

Controller 400 may include hardware and/or software based logic to perform controlling operations on behalf of a software program. For example, in one implementation, controller 400 may select and/or control parallel programming activities performed by software UE 410 on behalf of technical computing environment 320.

Software unit of execution (UE) 410 may include any of the features described above in the definition of the term "software unit of execution." In one implementation, software UE 410 may include one or more labs (e.g., labs 420-1, 420-2, 420-3, and 420-3, collectively referred to as "labs 420"). A "lab," as the term is used herein, is to be broadly interpreted to include a software resource that performs and/or participates in parallel programming activities. For example, a lab may perform and/or participate in parallel programming activities in response to a receipt of one or more portions of the program. In one implementation, a lab may be similar to a software unit of execution, except on a smaller scale. In other implementations, a lab may represent a single software unit of execution.

In an exemplary operation, technical computing environment 320 may provide a main program 430 to controller 400. Controller 400 may provide portions of program 430 (e.g., program portions 440-1, 440-2, 440-3, and 440-4, collectively referred to as "program portions 440") to labs 420-1, 420-2, 420-3, and 420-4, respectively, of software UE 410. Labs 420 may execute program portions 440, and may provide results to controller 400. For example, lab 420-1 may provide a result 450-1 to controller 400, lab 420-2 may provide a result 450-2 to controller 400, lab 420-3 may provide a result 450-3 to controller 400, and lab 420-4 may provide a result 450-4 to controller 400. Controller 400 may combine the results into a single result 460, and may provide single result 460 to technical computing environment 320.

Although FIG. 4 shows exemplary components of parallel programming environment 130, in other implementations, parallel programming environment 130 may contain fewer, different, or additional components than depicted in FIG. 4. In still other implementations, one or more components of parallel programming environment 130 may perform the tasks performed by one or more other components of parallel programming environment 130.

Exemplary Parallel Programming Interfaces

Figure 5A:
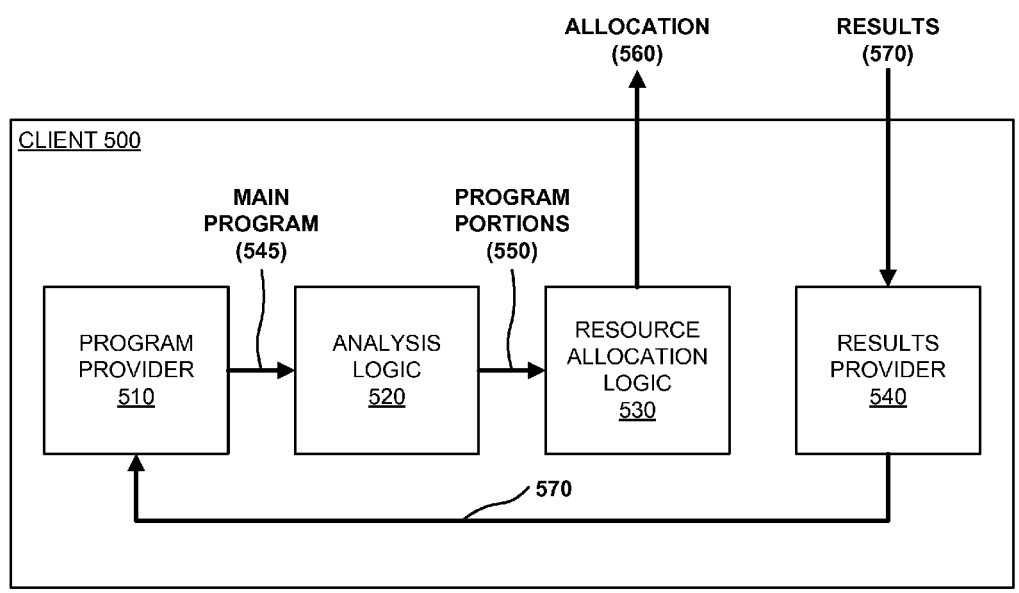
FIG. 5A is an exemplary diagram of functional components of a parallel programming interface depicted in FIG. 1.

FIG. 5A is an exemplary diagram of functional components of parallel programming interface 140. As illustrated, parallel programming interface may include a client 500 that includes a variety of functional components, such as a program provider 510, analysis logic 520, resource allocation logic 530, and/or a results provider 540.

Client 500 may include one or more entities. An entity may be defined as a device, such as a personal computer, a personal digital assistant (PDA), a laptop, or another type of computation or communication device, a thread or process running on one of these devices, and/or an object executable by one of these devices. In an exemplary implementation, client 500 may include a device capable of providing a parallel programming interface, as described herein. Although not shown in FIG. 5A, client 500 may include a technical computing environment (e.g., TCE 320) and a library (e.g., library 330). Other implementations of client 500 may contain fewer, different, or additional components than depicted in FIG. 5.

Program provider 510 may include hardware and/or software based logic that provides one or more programs for execution. For example, in one implementation, program provider 510 may generate programs created using a technical computing environment, as defined above. As shown in FIG. 5, program provider 540 may provide a main program 545 to analysis logic 520.

Analysis logic 520 may receive main program 545, and may include hardware and/or software based logic that analyzes main program 545 and parses main program 545 into one or more program portions 550. In one implementation, analysis logic 520 may include language constructs (as described below in connection with FIGS. 7-9) that parse main program 545 into one or more program portions 550. As shown in FIG. 5, analysis logic 520 may provide program portions 550 to resource allocation logic 530. Further details of analysis logic 520 are provided below in connection with FIGS. 7-9.

Resource allocation logic 530 may receive program portions 550, and may include hardware and/or software based logic that dynamically allocates (as indicated by reference number 560) program portions 550 to one or more software UEs (e.g., software UE 410) for parallel execution. Although not shown in FIG. 5A, allocation 560 may be provided to one or more software UEs, and the software UEs may be executed by one or more hardware UEs (e.g., hardware UE 200) in a parallel programming manner. Alternatively and/or additionally, if no external resources (e.g., external software UEs or external hardware UEs) are available, allocation 560 may be executed via software UEs and/or hardware UEs of client 500. The software UEs may return results 570 of the execution of program portions 550 to results provider 540. Further details of resource allocation logic 530 are provided below in connection with FIGS. 10 and 11.

Results provider 540 may include hardware and/or software based logic that receives results 570 from the software UEs, and provides results 570 to program provider 510. In one implementation, results provider 540 may combine results 570 into a single result, and may provide the single result to program provider 510.

Client 500 (e.g., via analysis logic 520) may use different control and data passing layers through which it may specify the current behavior of a part or a whole of the parallel programming interface 140. For example, in one implementation, client 500 may use a message passing interface (MPI), a Transmission Control Protocol/Internet Protocol (TCP/IP), an Ethernet, and/or other interconnects and protocols for the control and data passing layers. In another implementation, client 500 may implement an MPI layer (and/or other data and control layers) on any standard non-guaranteed stream protocol. In still another implementation, client 500 may use two different layers, a cooperative communication layer (e.g., where processes may need to agree that a particular type of message is being sent) and an imperative communication layer or control layer (e.g., that may send unexpected messages to a recipient and may request the recipient to undertake an instruction contained in the message).

Client 500 (e.g., via analysis logic 520) may define a sub-group behavior for each of program portions 550. A "sub-group," as the term is used herein, may be broadly defined to include any part of the overall set of processes (e.g., main program 545 and/or program portions 550). For example, the sub-group behavior may relate to the parallel programming styles that may be employed on the group of program portions 550. However, client 500 may dynamically change the behavior of one or more of program portions 550 as code is executed for other program portions 550. In one implementation, client 500 may use the control layer to change the current state of a sub-group at any time, which may dynamically change the behavior of that portion of the group. For example, an application (e.g., main program 545) may include different phases (e.g., an input phase, an analysis phase, an output phase, etc.), and parallel programming needs may be different for each phase.

In one implementation, the sub-group behavior may include an unused state (e.g., the initial state of a process when it is not being used), a user-controlled UE state (e.g., if a user has acquired a process as a UE object), a task parallel state (e.g., an execution state used by parallel programming constructs), a single program, multiple data (SPMD) state (e.g., one or more processes may have a MPI ring between them with appropriate values for rank and size), a stream state (e.g., a state where task allocation may be expressed in a directed acyclic graph (DAG) or a cyclic graph with delays), etc. Each of program portions 550 may be in one of the above-mentioned states, and may request other tasks to be placed in a new state.

The sub-group behavior may include a variety of other states. For example, the sub-group behavior may include a delayed debugging state where a task may be executed and delayed in time with respect to another task (or delayed in lines of code). A delayed debugging state may permit system 900 to create a breakpoint for one task if another task experiences an error, and may enable a user to see why an error occurred. In another example, the sub-group behavior may include a release differences state that may execute one or more tasks associated with different releases of a product (e.g., different releases of TCE 320). This may permit behavior differences to be found between different releases of a product, and may permit users to undertake release compatibility studies.

In one implementation, some state information may be consistent across client 500. For example, a source of code may come from one device (e.g., client 500), and a file system associated with the source device may be used across client 500. In another implementation, some state information may be consistent across a sub-group of client 500 (e.g., labindex, numlabs, etc.).

In another implementation, the state information may be automatically transferred from client 500 to software unit of execution 410 and/or labs 420. For example, if a path is added to a technical computing environment (e.g., TCE 320) of client 500, then the path may be automatically added to all TCEs in the parallel environment (e.g., TCEs provided in labs 420). If the TCE of client 500 is instructed to reanalyze a piece of code (e.g., because a program changed), then all of the TCEs in the parallel environment may be instructed to reanalyze the piece of code For a sub-group, this may be similar to changing a parallel random number seed, or possibly clearing a particular workspace (e.g., one of labs 420) to ensure clean evaluation of some program.

In still another implementation, client 500 may be interactive in that resource allocation logic 530 may permit a user to dynamically control a current setup (e.g., via scripts, functions, command lines, etc.). Thus, client 500 and its configuration may change based on an actual analysis that the user may be currently undertaking. In another implementation, resource allocation logic 530 may be connected to one or more clusters of software UEs 410 and may use processes derived from each of the clusters, as well as client 500, to form the functional components of client 500. In still another implementation, client 500 may include devices having different architectures and/or operating systems (Oss) (i.e., client 500 may execute across multiple platforms). For example, client 500 may include a different architecture and/or OS than software UE 410.

In one exemplary implementation, main program 545 may be submitted in batch manner to a cluster (e.g., a cluster of software UEs 410 and/or a cluster of labs 420). For example, a user may interactively develop main program 545, and may save main program 545 in a file (e.g., an M file). A command may exist in main program 545 (e.g., in the M file) that may cause one lab (e.g., one of labs 420) in the cluster to act as a client where the execution of main program 545 initiates. Main program 545, for example, may use four labs 420 and a client (e.g., one of labs 420 acting as a client), may initiate on the client, and may utilize as many labs 420 as necessary to carry out execution. In another example, a special type of job may be created that creates a pool (or cluster) of labs, where one of the initiated processes of the job may act as the client, and rest of processes may be in the pool.

Figure 5B:
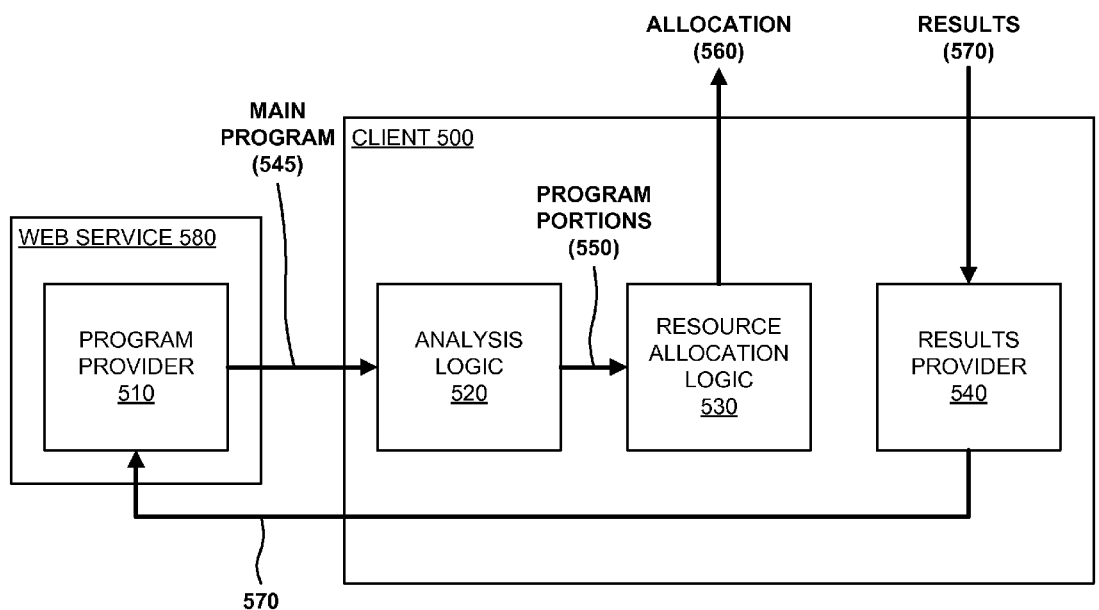
FIG. 5B is an exemplary diagram of functional components of the parallel programming interface in an alternative arrangement.

FIG. 5B is an exemplary diagram of functional components of parallel programming interface 140 in an alternative arrangement. The alternative arrangement depicted in FIG.

5B is the same as the arrangement of FIG. 5A, except that program provider 510 may be included in a web service 580, while analysis logic 520, resource allocation logic 530, and results provider 540 may be include in client 500. Program provider 510, analysis logic 520, resource allocation logic, and/or results provider 540 may operate in the manner as described above in connection with FIG. 5A.

Web service 580 may provide access to one or more programs (e.g., main program 545) provided by program provider 510, applications accessed by main program 545, etc.). A "web service," as the term is used herein, is to be broadly interpreted to include any software application that allows machine-to-machine communications over a network (e.g., a local area network (LAN), a metropolitan area network (MAN), a wide area network (WAN), such as the Internet, etc.). For example, a web service may communicate with a client (e.g., client 500) using an application program interface (API) that the client may access over the network. The web service may exchange Hypertext Markup Language (HTML), Extensible Markup Language (XML), or other types of messages with the client using industry compatible standards (e.g., simple object access protocol (SOAP)) and/or proprietary standards. A web service may further include network services that can be described using industry standard specifications, such as web service definition language (WSDL) and/or proprietary specifications.

In one exemplary implementation, web service 580 may allow a destination (e.g., a computer operated by a customer) to perform parallel programming using hardware and/or software UEs that may be operated by a service provider (e.g., client 500). For example, the customer may be permitted access to client 500 to perform parallel programming if the customer subscribes to one of the offered web services. The service provider may maintain a database that includes parameters, such as parameters that indicate the status of hardware UEs, software UEs, etc. The service provider may perform a look-up operation in the database if a request for parallel programming is received from the customer. The service provider may connect the customer to parallel programming resources that are available based on parameters in the database.

In another exemplary implementation, the customer may receive web service 580 on a subscription basis. A subscription may include substantially any type of arrangement, such as monthly subscription, a per-use fee, a fee based on an amount of information exchanged between the service provider and the customer, a fee based on a number of processor cycles used by the customer, a fee based on a number of hardware UEs, software UEs, etc., used by the customer, etc.

Figure 5C:
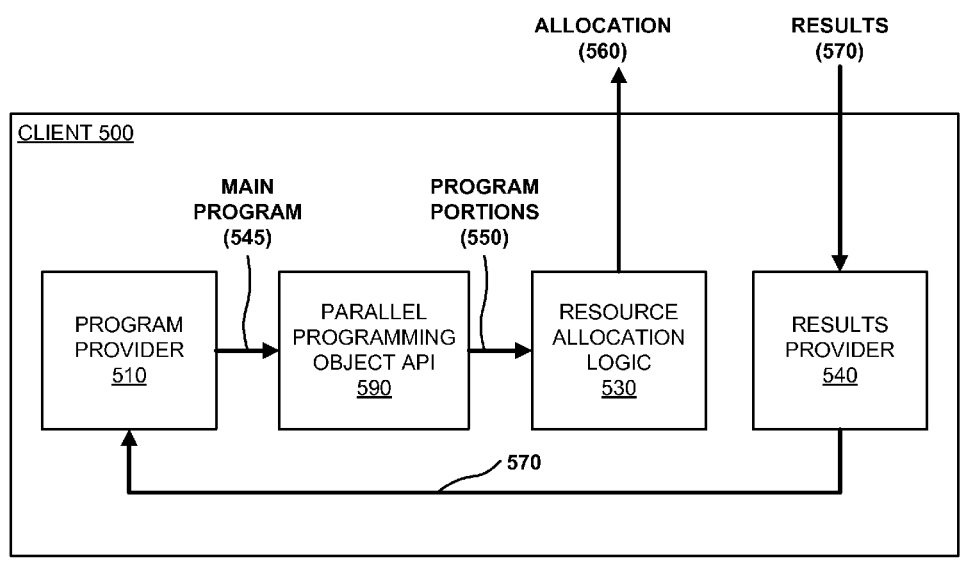
FIG. 5C is an exemplary diagram of functional components of the parallel programming interface in another alternative arrangement.

FIG. 5C is an exemplary diagram of functional components of parallel programming interface 140 in another alternative arrangement. The alternative arrangement depicted in FIG. 5C is the same as the arrangement of FIG. 5A, except that analysis logic 520 may be replaced with a parallel programming object API 590. Program provider 510, resource allocation logic, and/or results provider 540 may operate in the manner as described above in connection with FIG. 5A.

Parallel programming object API 590 may permit a user to specify how main program 545 may be parallelized. Parallel programming object API 590 may cooperate with resource allocation logic 530 and/or execution mechanism (e.g., software UEs 420) in a similar manner that analysis logic 520 cooperates with these components. However, parallel programming API 590 may offer much more flexibility and/or customization.

Although FIGS. 5A-5C show exemplary components of parallel programming interface 140, in other implementations, parallel programming interface 140 may contain fewer, different, or additional components than depicted in FIGS. 5A-5C. In still other implementations, one or more components of parallel programming interface 140 may perform the tasks performed by one or more other components of parallel programming interface 140.

Exemplary Client/Web Service Architecture

Figure 6:
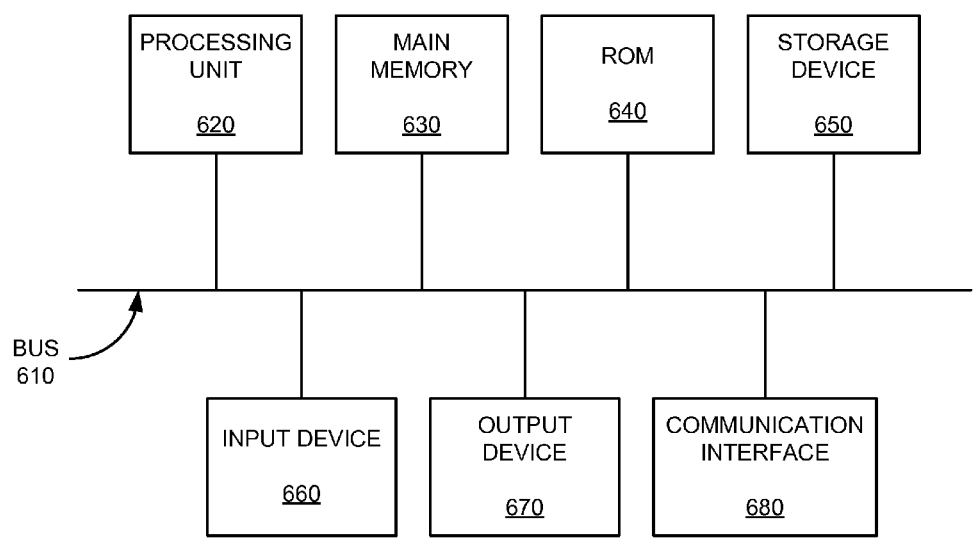
FIG. 6 illustrates exemplary hardware components of a client and/or a web service depicted in FIGS. 5A and 5B.

FIG. 6 is an exemplary diagram of an entity corresponding to client 500 and/or web service 580. As illustrated, the entity may include a bus 610, a processing unit 620, a main memory 630, a read-only memory (ROM) 640, a storage device 650, an input device 660, an output device 670, and/or a communication interface 680. Bus 610 may include a path that permits communication among the components of the entity.

Processing unit 620 may include a processor, microprocessor, or other types of processing logic that may interpret and execute instructions. In one implementation, processing unit 620 may include a single core processor or a multi-core processor. In another implementation, processing unit 620 may include a single processing device or a group of processing devices, such as a processor cluster or computing grid. In still another implementation, processing unit 620 may include multiple processors that may be local or remote with respect each other, and may use one or more threads while processing. In a further implementation, processing unit 620 may include multiple processors implemented as hardware UEs capable of running copies of a technical computing environment.

Main memory 630 may include a random access memory (RAM) or another type of dynamic storage device that may store information and instructions for execution by processing unit 620. ROM 640 may include a ROM device or another type of static storage device that may store static information and/or instructions for use by processing unit 620. Storage device 650 may include a magnetic and/or optical recording medium and its corresponding drive, or another type of static storage device (e.g., a disk drive) that may store static information and/or instructions for use by processing unit 620.

Input device 660 may include a mechanism that permits an operator to input information to the entity, such as a keyboard, a mouse, a pen, a microphone, voice recognition and/or biometric mechanisms, etc. Output device 670 may include a mechanism that outputs information to the operator, including a display, a printer, a speaker, etc. Communication interface 680 may include any transceiver-like mechanism that enables the entity to communicate with other devices and/or systems. For example, communication interface 680 may include mechanisms for communicating with another device or system via a network.

As will be described in detail below, the entity depicted in FIG. 6 may perform certain operations in response to processing unit 620 executing software instructions contained in a computer-readable medium, such as main memory 630. A computer-readable medium may be defined as a physical or logical memory device and/or carrier wave. The software instructions may be read into main memory 630 from another computer-readable medium, such as storage device 650, or from another device via communication interface 680. The software instructions contained in main memory 630 may cause processing unit 620 to perform processes that will be described later. Alternatively, hardwired circuitry may be used in place of or in combination with software instructions to implement processes described herein. Thus, implementations described herein are not limited to any specific combination of hardware circuitry and software.

Although FIG. 6 shows exemplary components of the entity, in other implementations, the entity may contain fewer, different, or additional components than depicted in FIG. 6. In still other implementations, one or more components of the entity may perform the tasks performed by one or more other components of the entity.

Exemplary Parallel Programming API

Parallel Programming Object Interface

Parallel programming interface 140 may provide a parallel programming application program interface (API) (e.g., a code-based interface) that may define and implement an object in a technical computing environment (e.g., TCE 320) that corresponds to another one or more (or set of) executing technical computing environments. The parallel programming API may permit customizable parallelism of a program (e.g., main program 545), and may be nested in other calls or function (e.g., in the parallel programming constructs described below in connection with FIGS. 7-9). The parallel programming API may be used by other calls as inputs to a calling function so that which labs (e.g., labs 420) to use may be known. For example, in one implementation, the parallel programming API may be called a MATLAB® unit of execution (or MUE) API. The MUE API may define and implement an object in MATLAB® that corresponds to another one or more of executing MATLABs®. The MUE API may be used to permit one technical computing environment to communicate with and control another technical computing environment. The MUE API may be used to create groups of processes with certain behaviors (e.g., using the language constructs described below in connection with FIGS. 7-9).

The MUE API may include the following constructors, which may create one or more MUEs:
   m=mue (which may create a new MATLAB); and
   m=mue(n) (which may create an array of "n" new MATLABs).

The MUE API may include the following methods and associated actions:
   PUT—may copy data to a MUE;
   GET—may copy data from a MUE;
   EVAL—may evaluate a string asynchronously;
   EVALNOW—may evaluate a string synchronously;
   FEVAL—may evaluate a function asynchronously;
   FEVALNOW—may evaluate a function synchronously;
   ISBUSY—may ask if a MUE if it is busy;
   SELECT—may block until a MUE is not busy;
   WAIT—may block until the MUE is not busy; and
   INTERRUPT—may interrupt a MUE.

The MUE API may perform the following exemplary processes. In a first exemplary process, an array of MUEs may be created, and some data may be moved each created MUE. Each MUE may be told to perform different functions, and the process may wait until the MUEs have performed the different functions. The results may be gathered from the MUEs (or alternatively, the results may be kept separate), and the MUEs may be shut down. Such a process may be performed using the following syntax:

```
% create an array of mues
m = mue(4);
a = rand(1,50);
b = rand(1,50);
% move some data to all of them
put(m,'A',a);
put(m,'B',b);
% tell each to do a different thing
eval(m(1),'test1');
eval(m(2),'test2');
eval(m(3),'test3');
eval(m(4),'test4');
% wait until they have all finished
wait(m);
% gather the results
r1 = get(m,'R')
% Alternatively, keep the results separate
r2 = get(m,'R','cell')
% shut down the mues
clear m
```

In a second exemplary process, a function may be evaluated for several values of two parameters (e.g., two parameter vectors), and arguments may be created. MUEs may be used, and the MUEs may be given different random number seeds. The work may be performed, the results may be displayed, and the MUEs may be shut down. Such a process may be performed using the following syntax:

```
% Evaluate a function for many values of two parameters. Parameter
vectors we will sweep over
temperatures = 0:1:13;
pressures = 0.5:0.1:1.7;
% create arguments
[arg1,arg2] = meshgrid(temperatures,pressures);
% here are the mues we will use
mues = mue(ceil(10 * rand));
% give them different random number seeds
for i = 1:length(mues)
    mues(i).feval('rand',i);
end
% do the work
result = apply(mues,'MyComputationallyIntensiveFunction',arg1,arg2);
% display the results and shutdown
surf(arg1,arg2,result)
xlabel('temperature')
ylabel('pressure')
zlabel('Computationally intensive function of temperature and pressure');
clear mues
```

Exemplary Parallel Programming API

Parallel Programming Constructs

Figure 7:
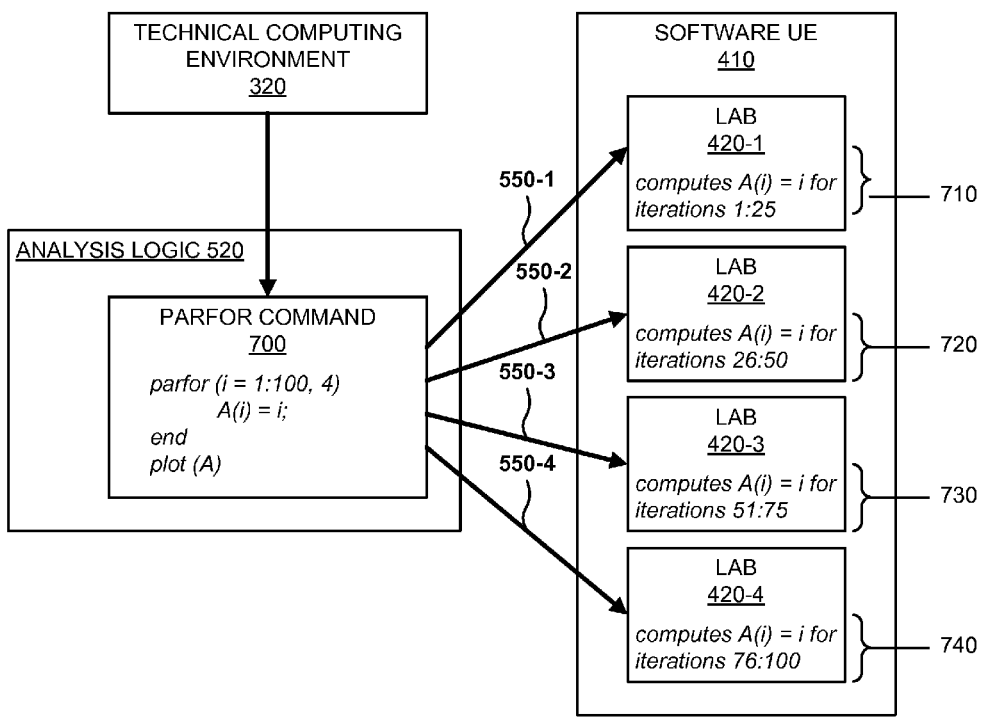
FIG. 7 illustrates an exemplary parallel programming construct capable of being analyzed and transformed to parallel program portions by the analysis logic depicted in FIGS. 5A and 5B.

FIG. 7 illustrates an exemplary parallel programming construct (e.g., PARFOR command 700) capable of being analyzed and transformed to parallel program portions by analysis logic 520 of parallel programming interface 140. As shown, PARFOR command 700 may be created with TCE 320 and provided to analysis logic 520 of client 500. In other implementations, PARFOR command 700 may be created by another device and/or may be provided to analysis logic 520 of client 500. In one example, analysis logic 520 may implement PARFOR command 700 to generate program portions 550. PARFOR command 700 may include the following exemplary syntax:

```
parfor (i = 1:100, 4)
    A(i) = i;
end
plot (A)
```

Significant performance gains may be realized by providing parallel programming constructs (e.g., PARFOR command 700) that use available computational resources. By identifying concurrencies in their programs, where a set of computations may be executed independent of each other, users may be able to solve problems faster. One such parallel programming construct may include a parallel FOR loop (e.g., PARFOR command 700). PARFOR command 700 may include the following general form:

PARFOR (variable=expr), statement, . . . , statement, END.
PARFOR command 700 may be a work sharing construct that executes the loop body for a set of iterations simultaneously by using available resources. To accomplish this, the body of PARFOR command 700 may be written such that each iteration may be independent of the other iterations (i.e., the loop iterations may be order-independent). PARFOR command 700 may terminate if all the resources finish executing the loop body for their assigned set of iterations (e.g., program portions 550). Analysis logic 520 may implement PARFOR command 700 based on the definition that its body is iteration-independent.

If execution of PARFOR command 700 produces unexpected results for a user, an appropriate diagnostic message may be displayed indicating a reason for the unexpected results. In one implementation, debugging information (e.g., the iteration number, resources that failed, the statement being executed, etc.) may be provided to the user device (e.g., client 500) that initiated PARFOR command 700. If an error occurs during execution of PARFOR command 700, all iterations in progress may be terminated, and new iterations may not be initiated.

Semantics for PARFOR command 700 may not be influenced by what happens (e.g., in terms of usage of variables) before or after the PARFOR section. Temporary variables may persist after execution of PARFOR command 700. In one implementation, PARFOR command 700 may be optimized to selectively determine which temporary variables may be permitted to persist after execution of PARFOR command 700.

Since PARFOR command 700 may be executed on different resources (e.g., software UEs 410, hardware UEs 200, etc.), variables (e.g., loop index, right-hand side variables within the loop body, etc.) that execute the body of PARFOR command 700 may be transferred to and/or created on such resources. The number of resources to be used with PARFOR command 700 may be controlled by specifying an optional input to PARFOR command 700 of the form:

PARFOR (variable=expr, N), statement, . . . , statement, END, where N may be an integer representing a maximum number of resources to try to use. If N is not specified, the number of resources to use may be specified via a resource configuration and management utility. If there are not enough resources available to satisfy the specified N, the available resources may be initiated as part of the execution of PARFOR command 700.

Analysis logic 520 may determine variables and/or data of program portions 550 to be transferred to software UE 410. Analysis logic 520 may transform program portions 550 and may transfer variables and/or data based on the determination of the variables and/or data. Analysis logic 520 may provide execution or run time control of how the iterations get allocated to software UE 410 (e.g., labs 420 of software UE 410). For example, in one implementation, client 500 (via allocation logic 530) may use any of the allocation strategies described above in connection with FIG. 10 to provide run time control of iteration allocation. In other implementations, users may be provided with dynamic options for iteration distribution schemes.

Returning to FIG. 7, program portions 550 of PARFOR command 700 may be allocated to and/or executed by one or more labs 420 of software UE 410. As shown in the exemplary arrangement of FIG. 7, a first portion 710 of PARFOR command 700 may be allocated to lab 420-1, a second portion 720 of PARFOR command 700 may be allocated to lab 420-2, a third portion 730 of PARFOR command 700 may be allocated to lab 420-3, and/or a fourth portion 740 of PARFOR command 700 may be allocated to lab 420-4. First portion 710 may compute A(i) for iterations 1:25, second portion 720 may compute A(i) for iterations 26:50, third portion 730 may compute A(i) for iterations 51:75, and fourth portion 730 may compute A(i) for iterations 76:100, via labs 420-1, 420-2, 420-3, and 420-4, respectively.

Although FIG. 7 shows an exemplary parallel programming construct, in other implementations, client 500 may contain fewer, different, or additional parallel programming constructs than depicted in FIG. 7. In still other implementations, the exemplary parallel programming construct may be allocated in other ways than depicted in FIG. 7.

Figure 8:
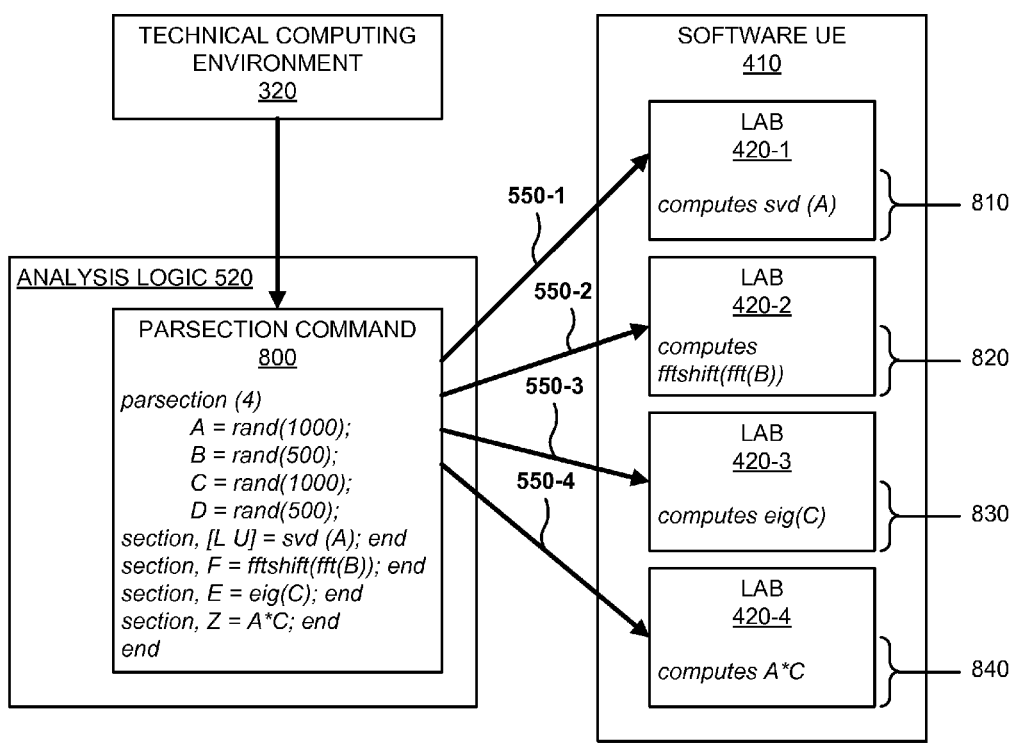
FIG. 8 illustrates another exemplary parallel programming construct capable of being analyzed and transformed to parallel program portions by the analysis logic depicted in FIGS. 5A and 5B.

FIG. 8 illustrates an exemplary parallel programming construct (e.g., PARSECTION command 800) capable of being analyzed and transformed to parallel program portions by analysis logic 520 of parallel programming interface 140. As shown, PARSECTION command 800 may be created with TCE 320 and provided to analysis logic 520 of client 500. In other implementations, PARSECTION command 800 may be created by another device and/or may be provided to analysis logic 520 of client 500. In one example, analysis logic 520 may implement PARSECTION command 800 to generate program portions 550. PARSECTION command 800 may include the following exemplary syntax:

```
parsection (4)
    A = rand(1000);
    B = rand(500);
    C = rand(1000);
    D = rand(500);
    section, [L U] = svd (A); end
    section, F = fftshift(fft(B)); end
    section, E = eig(C); end
    section , Z = A*C; end
end
```

Significant performance gains may be realized by providing parallel programming constructs (e.g., PARSECTION command 800) that use available computational resources. By identifying concurrencies in their programs, where a set of computations may be executed independent of each other, users may be able to solve problems faster. One such parallel programming construct may include a parallel SECTION command (e.g., PARSECTION command 800). PARSECTION command 800 may include the following general form:

PARSECTION, section . . . END, section . . . END, END.

PARSECTION command 800 may enable independent sections of code to be executed simultaneously on different resources. Execution of PARSECTION command 800 may wait for all code sections to be complete. The number of code sections and/or the number of available resources may be unrelated, and PARSECTION command 800 may be associated with any idle resources available to execute the code sections. In order to control the number of resources to associated with PARSECTION command 800, an optional parameter (N, which may indicate the number of resources to use) may be included in the general form as follows:

PARSECTION (N), SECTION . . . END, SECTION, . . . END, END.

Analysis logic 520 may determine independent segments or sections of code associated with program portions 550. For example, in one implementation, analysis logic 520 may perform a dependency analysis on the sections of the code to determine independent sections. Analysis logic 520 may analyze PARSECTION command 800 and may determine sections of the code to be executed together and sections of the code that may undergo staggered execution. Analysis logic 520 may determine sections of the code to allocate to software UE 410 (e.g., labs 420 of software UE 410), and/or results to be returned at the end of PARSECTION command 800. For example, in one implementation, client 500 (via allocation logic 530) may use any of the allocation strategies described above in connection with FIG. 10 to provide run time control of code section allocation.

Returning to FIG. 8, PARSECTION command 800 may be allocated to and/or executed by one or more labs 420 of software UE 410. As shown in the exemplary arrangement of FIG. 7, a first portion 810 of PARSECTION command 800 may be allocated to lab 420-1, a second portion 820 of PARSECTION command 800 may be allocated to lab 420-2, a third portion 830 of PARSECTION command 800 may be allocated to lab 420-3, and/or a fourth portion 840 of PARSECTION command 800 may be allocated to lab 420-4. First portion 810 may compute svd(A), second portion 820 may compute fftshift(fft(B)), third portion 830 may compute eig (C), and fourth portion 840 may compute A*C, via labs 420-1, 420-2, 420-3, and 420-4, respectively.

Although FIG. 8 shows an exemplary parallel programming construct, in other implementations, client 500 may contain fewer, different, or additional parallel programming constructs than depicted in FIG. 8. In still other implementations, the exemplary parallel programming construct may be allocated in other ways than depicted in FIG. 8.

Figure 9:
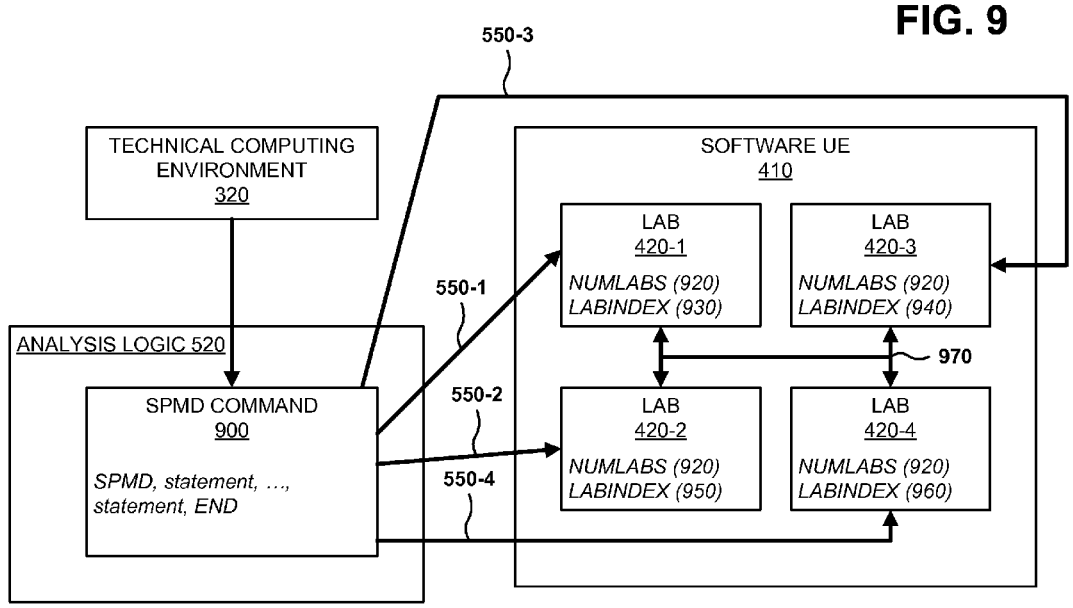
FIG. 9 illustrates still another exemplary parallel programming construct capable of being analyzed and transformed to parallel program portions by the analysis logic depicted in FIGS. 5A and 5B.

FIG. 9 illustrates an exemplary parallel programming construct (e.g., SPMD command 900) capable of being analyzed and transformed to parallel program portions by analysis logic 520 of parallel programming interface 140. As shown, SPMD command 900 may be created with TCE 320 and provided to analysis logic 520 of client 500. In other implementations, SPMD command 900 may be created by another device and/or may be provided to analysis logic 520 of client 500. In one example, analysis logic 520 may implement SPMD command 900 to generate program portions 550.

SPMD command 900 may permit users to enter into a SPMD mode. In one implementation, SPMD command 900 may support data parallelism whereby large data may be distributed across multiple software UEs (e.g., software UEs 410 and/or labs 420) via a distributed arrays API. Operations on the distributed arrays may be coordinated through communication between labs 420 that own pieces of the array. The general form of SPMD command 900 may include:

SPMD, statement, . . . , statement, END.

The "statements" in the body of SPMD command 900 may be executed on resources (e.g., software UEs 410 and/or labs 420) that may be defined by a default configuration. SPMD command 900 may configure these resources as a communicating ring of labs (e.g., ring of labs 420), which may mean that labs 420 may have a same number of labs (e.g., NUMLABS) 920 defined, each lab 420 may have a unique value (e.g., LABINDEX 930, 940, 950, and 960 for labs 420-1, 420-2, 420-3, 420-4, respectively) between one and NUMLABS 920, labs 420 may send data to and from one another, and/or each lab 420 may include a unique random number generator that creates random number streams independent of one another.

Upon completion of SPMD command 900, labs 420 may be "cleaned up," which may mean that labs 420 may be restored to ordinary resources (e.g., after the results are received), NUMLABS 920 and LABINDEX 930-940 may set back to one, the random number generators may be set back to a default start value, and/or workspaces may be cleared. There may be no implicit data transfer to and from the workspace where SPMD command 900 is called and the workspaces of labs 420 executing the body of SPMD command 900. An error on any of labs 420 executing the body of SPMD command 900 may cause an error in SPMD command 900. A warning on any of labs 900 executing the body of SPMD command 900 may be displayed on a device (e.g., client 500).

SPMD command 900 of the form SPMD NUMWORKERS, statement, . . . , statement, END may execute SPMD command 900 on an anonymous group of a number (e.g., NUMWORKERS) of resources provided within a default resource pool. SPMD command 900 of the form SPMD MYWORKERS, statement, . . . , statement, END may execute SPMD command 900 on a specified group of resources (e.g., MYWORKERS).

The syntax [OUT1, OUT2, . . . ]=SPMD(IN1, IN2, . . . ), statement, . . . , statement, END may transfer variables (e.g., IN1, IN2, . . . ) from client 500 to workspaces of labs 420 at the beginning of SPMD command 900, and may transfer variables (e.g., OUT1, OUT2, . . . ) from one of the workspaces back to client 500 at the end of SPMD command 900. If the variable being transferred from client 500 to labs 420 is a distributed array (e.g., a "darray"), then the variable may be automatically re-distributed to all labs 420. If the variable being transferred from client 500 is a non-distributed array, then the variable may be replicated on all labs 420. If the variable being transferred from labs 420 to client 500 is a replicated array, then a replicated value may be received from any of labs 420. If the variable being transferred from labs 420 to client 500 is a variant array, then a value may be received from one of labs 420. If the variable being transferred from labs 420 to client 500 is a distributed array, then the variable may be automatically re-distributed to be a distributed array over a single lab 420.

To avoid this redistribution back to client 500, a remote handle (e.g., "rhD1") to a distributed array (e.g., "D1") may be created on labs 420, and a replicated array may be provided to client 500 using the following syntax:

```
[rhD1] = spmd(n)
    D1 = rand(n,darray( ));
    rhD1 = remoteHandle(D1);
end.
```

The remote handle (rhD1) to the distributed array (D1) may be used to pass the distributed array (D1) to subsequent SPMD commands or blocks. However, the user may first dereference the remote handle to access and operate on the distributed array using the following syntax:

```
spmd(rhD1)
    D1 = getDistributedArrayBackFromHandle(rhD1);
    % use the distributed array D1
end.
```

In one implementation, SPMD command 900 (and its associated syntax) may be implemented via client 500 (e.g. via analysis logic 520 of client 500), software UEs 410 (including labs 420), and/or TCE 320. In other implementations, SPMD command 900 (and its associated syntax) may be implemented via other software and hardware logic. SPMD command 900 may increase processing performance by dividing large data sets into pieces, and by providing each piece to different resources. Each resource may execute the same program on its piece of data, and the results may be collected.

Although FIG. 9 shows an exemplary parallel programming construct, in other implementations, client 500 may contain fewer, different, or additional parallel programming constructs than depicted in FIG. 9. In still other implementations, the exemplary parallel programming construct may be allocated in other ways than depicted in FIG. 9.

In one implementation, the parallel programming constructs depicted in FIGS. 7-9 may each perform four things consistently. First, the parallel programming constructs may or may not allow for persistence. Second, the parallel programming constructs may permit any data to be manually and/or automatically sent and returned from the parallel programming constructs' workspace (e.g., labs 420). Third, any state (e.g., a path, workspace variables, random number seed, current directory, etc.) may be set or reset when initially calling and/or when exiting any of the parallel programming constructs. Finally, the behavior of distributed arrays into and out of the parallel program constructs may be one of three things (e.g., the behavior of distributed arrays may be redistributed based on the number of labs inside and outside the parallel programming constructs, a reference to the distributed array may be passed around, and/or distributed arrays going into and/or out of the parallel programming constructs may be passed around).

In another implementation, the parallel programming constructs depicted in FIGS. 7-9 may provide explicit variable transfer as defined by a program. For example, the syntax [B]=spmd(A), end may indicate that "A" is to be sent before running the code and "B" is to be returned afterwards. The parallel programming constructs depicted in FIGS. 7-9 may also provide implicit variable transfer. For example, for PARFOR command 700, all of the needed variables may be transferred as a result of an analysis of the code.

Exemplary Functional Diagram of Resource Allocation Logic

Figure 10:
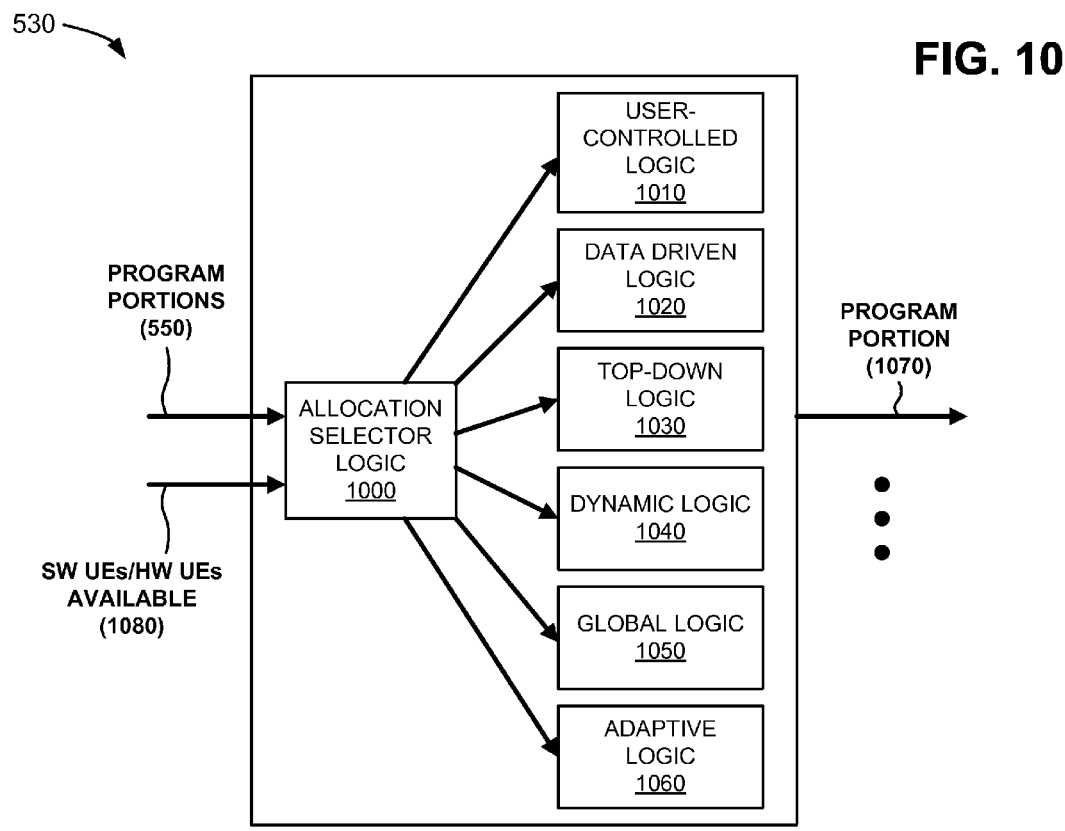
FIG. 10 is an exemplary diagram of resource allocation logic of the parallel program interfaces depicted in FIGS. 5A and 5B.

FIG. 10 is an exemplary diagram of exemplary functional components of resource allocation logic 530 of client 500. In one implementation, resource allocation logic 530 may decrease processing time by allocating and initializing resources (e.g., one or more software UEs 410, one or more labs 420 of software UE 410, and/or other devices) for one or more program portions 550. In another implementation, resource allocation logic 530 may select program portions 550 that minimize the amount of data to be sent, and may allocate program portions to software UE 410 (e.g., to one or more labs 420), multiple software UEs 410, and/or other resources that possess a program (e.g., TCE 320) and/or some or all of the data. The exact strategy for allocating program portions 550 to software UE 410, multiple software UEs 410, and/or other resources may depend upon engineering considerations related to specific hardware restrictions and/or communication fabric.

As shown in FIG. 10, resource allocation logic 530 may include a variety of functional components that may be implemented in hardware-based logic, software-based logic, a combination of hardware and software based logic, etc. As illustrated, resource allocation logic 530 may include allocation selector logic 1000, user-controlled logic 1010, data driven logic 1020, top-down logic 1030, dynamic logic 1040, global logic 1050, and/or adaptive logic 1060. Resource allocation logic 530 may nest parallel program portions (e.g., program portions 550), and, depending on the allocation strategy, may provide parallel program portions 550 to software UE 410, multiple software UEs 410, and/or other resources to optimize performance. Such nesting may occur explicitly, although in other implementations, nesting of parallel program portions may occur implicitly by usage of various applications by a user (e.g., the user may call functionality that could include nesting constructs).

Allocation selector logic 1000 may receive program portions 550 from analysis logic 520 and/or may determine available software UEs 410 and/or available hardware UEs 200 based on information 1080 indicating the availability of software UEs 410 and/or hardware UEs 200. Allocation selector logic 1000 may return a maximum number of resources (e.g., software UEs 410) available to simultaneously execute program portions 550. If allocation selector logic 1000 returns zero as the number, program portions 550 may be executed on the requesting device (e.g., client 500). Allocation selector logic 1000 may use available software UEs 410 and/or labs 420 to support many different parallel programming models. For example, the number of software UEs 410 and/or labs 420 may dynamically grow or shrink, a fixed number of software UEs 410 and/or labs 420 may be allocated (e.g., by allocation selector logic 1000) to program portions 550, and/or a number of software UEs 410 and/or labs 420 may be determined by allocation selector logic 1000 based on other criteria (e.g., cost, desired minimum time to solve, etc.). In one implementation, allocation selector logic 1000 may select an allocation strategy based on the determined software UEs 410 and/or labs 420 and/or based on program portions 550 (e.g., processing requirements of program portions 550). Allocation selector logic 1000 may select any of logic 1010-1060 for implementation of the allocation strategy.

In one implementation, allocation selector logic 1000 may determine whether to change a selected allocation strategy. If the allocation selector logic 1000 determines that the allocation strategy is to be changed, allocation selector logic 1000 may determine a different allocation strategy based on the determined software UEs 410 and/or labs 420 and/or based on program portions 550. If the allocation strategy is selected and/or determined, allocation selector logic 1000 may allocate one or more program portions 550 to one or more software UEs 410, and/or one or more labs 420. If one or more program portions 550 are completed by one or more resources, allocation selector logic 1000 may release the resources and may signal completion of the program portions 550 to a requesting device (e.g. client 500).

Allocation selector logic 1000 may examine a current allocation strategy and may select one or more of logic 1010-1060 based on the current allocation strategy. If allocation selector logic 1000 selects a user-controlled allocation strategy, user-controlled logic 1010 may, for example, be implemented. User-controlled logic 1010 may permit a user to specify how many resources (e.g., software UEs 410 and/or labs 420) are to be allocated to each program portion 550. The allocation may be performed in a first come, first served manner. If a program portion (e.g., program portion 1070) is completed, user-controlled logic 1010 may release the resources and may make them available to other program portions. If no resources are available, user-controlled logic 1010 may execute program portions 550 with resources of client 500. Alternatively, user-controlled logic 1010 may permit the user to identify specific resources (e.g., labs 420) to be used for a program portion, or to provide criteria for selecting resources to be allocated for a program portion. In one implementation, user-controlled logic 1010 may permit program portions 550 to use the minimum of a requested number of resources (e.g., software UEs 410 and/or labs 420) and an available number of resources.

If allocation selector logic 1000 selects a data driven allocation strategy, data driven logic 1020 may be implemented. Data driven logic 1020 may provide (or receive from the user) a program that may review parameters supplied to a program portion and may compute an optimal number of resources (e.g., software UEs 410 and/or labs 420) to be used for the program portion. For example, the program portions may specify that a parallel FOR loop (e.g., PARFOR command 700) may be performed locally (e.g., by client 500) if the loop contains less than "250" iterations; may be performed by a single resource (e.g., a single software UE 410 and/or a single lab 420-1 through 420-4) if the loop contains "251" through "1000" iterations; may be performed by two resources (e.g., two software UEs 410 and/or two labs 420) if the loop contains "1001" through "3500" iterations; and/or may be performed by three resources (e.g., three software UEs 410 and/or three labs 420) if the loop contains more than "3500" iterations. Alternatively, the program portions may specify resources to be allocated and/or criteria to guide the allocation. In one implementation, data driven logic 1020 may permit program portions 550 to use the minimum of either a requested number of resources (e.g., software UEs 410 and/or labs 420) or an available number of resources.

If allocation selector logic 1000 selects a top-down allocation strategy, top-down logic 1030 may be implemented. At a first parallel construct, top-down logic 1030 may divide available resources (e.g., software UEs 410 and/or labs 420) among a number of program portions 550 specified by a user (e.g., via client 500). If any sections of the parallel construct contain further parallel constructs, program portions 550 related to those section(s) may be further divided among the available resources. In one implementation, top-down logic 1030 may divide the number of available resources by the requested number of program portions 550. If there are fewer resources than the requested number of program portions 550, top-down logic 1030 may return the number of available resources. If there are more resources than the requested number of program portions 550, top-down logic 1030 may evenly allocate the program portions 550 among the available resources. For example, top-down logic 1030 may allocate one resource (e.g., one software UE 410 or one lab 420-1 through 420-4) to a particular program portion (e.g., program portion 1070) and/or may reserve other resources associated with the particular program portion for further programs initiated by the particular program portion.

If allocation selector logic 1000 selects a dynamic allocation strategy, dynamic logic 1040 may be implemented. Dynamic logic 1040 may take the number of program portions 550 (or workers) to be an upper limit. If a program portion is complete (e.g., the resource associated with the program portion is available), dynamic logic 1040 may determine what program portions 550 need help, and may assign such program portions to the available resources. Dynamic logic 1040 may allocate program portions 550 according to a priority queue, a round-robin algorithm, and/or any other strategy that precludes a program portion from waiting indefinitely for a resource. In one implementation, dynamic logic 1040 may return a value equal to the number of requested program portions 550. If a resource becomes available, dynamic logic 1040 may "check-in" the resource and may assign an unexecuted program portion to the available resource. If the program portion is executed, the resource may report its availability to dynamic logic 1040.

If allocation selector logic 1000 selects a global allocation strategy, global logic 1050 may be implemented. Global logic 1050 may inspect an application associated with program portions 550, and may allocate resources to each parallel section of the application based on additional information (e.g., supplied by the user and/or models), heuristics determining where additional resources would be the most beneficial, etc. For example, if a library routine may benefit from having four resources (e.g., four labs 420), global logic 1050 may reserve such resources for library routine calls. In one implementation, global logic 1050 may pre-compute and return the number of program portions.

If allocation selector logic 1000 selects an adaptive allocation strategy, adaptive logic 1060 may be implemented. Adaptive logic 1060 may allocate resources (e.g., software UEs 410 and/or labs 420) to program portions 550 based on an amount of time each program portion may take for execution. Adaptive logic 1060 may dynamically determine (e.g., as parallel programming is executing) the amount of time, and/or may derive the amount of time from data from previous executions of the allocation. In one implementation, adaptive logic 1060 may request that a segment of a program portions be completed, may calculate the time to execute the segment, and may determine whether to allocate additional resources to the program portion based on the calculated time.

Allocation selector logic 1000 may determine which resource should be assigned a program portion based on the selected allocation strategy. If the global allocation strategy is selected, the assigned resource may be predetermined. If the dynamic allocation strategy is selected, the assignment of the resource may dynamically depend upon which program portions require assistance and which resources are available. In other implementations, allocation selector logic 1000 may assign a resource that may complete a program portion with minimal processing time. For example, allocation selector logic 1000 may assign a program portion to a resource that includes a program to execute the program portion, some or all of the data to execute the program portion, fast communication protocols with the requesting device (e.g., client 500), etc.

Although FIG. 10 describes exemplary allocation strategies, in other implementations, resource allocation logic 530 may include other allocation strategies (e.g., hybrids of the exemplary allocation strategies, multiple allocation strategies, different allocation strategies for different phases of a job, etc.). In one implementation, resource allocation logic 530 (e.g., allocation logic selector 1000) may recommend allocation strategies based on an analysis of a currently-selected allocation strategy. In another implementation, resource allocation logic 530 may select an allocation strategy, may change an allocation strategy, and/or may implement the selected or changed allocation strategy.

Although FIG. 10 shows exemplary functional components of resource allocation logic 530, in other implementations, resource allocation logic 530 may contain fewer, different, or additional functional components than depicted in FIG. 10. In still other implementations, one or more functional components of resource allocation logic 530 may perform the tasks performed by one or more other functional components of resource allocation logic 530.

Figure 11:
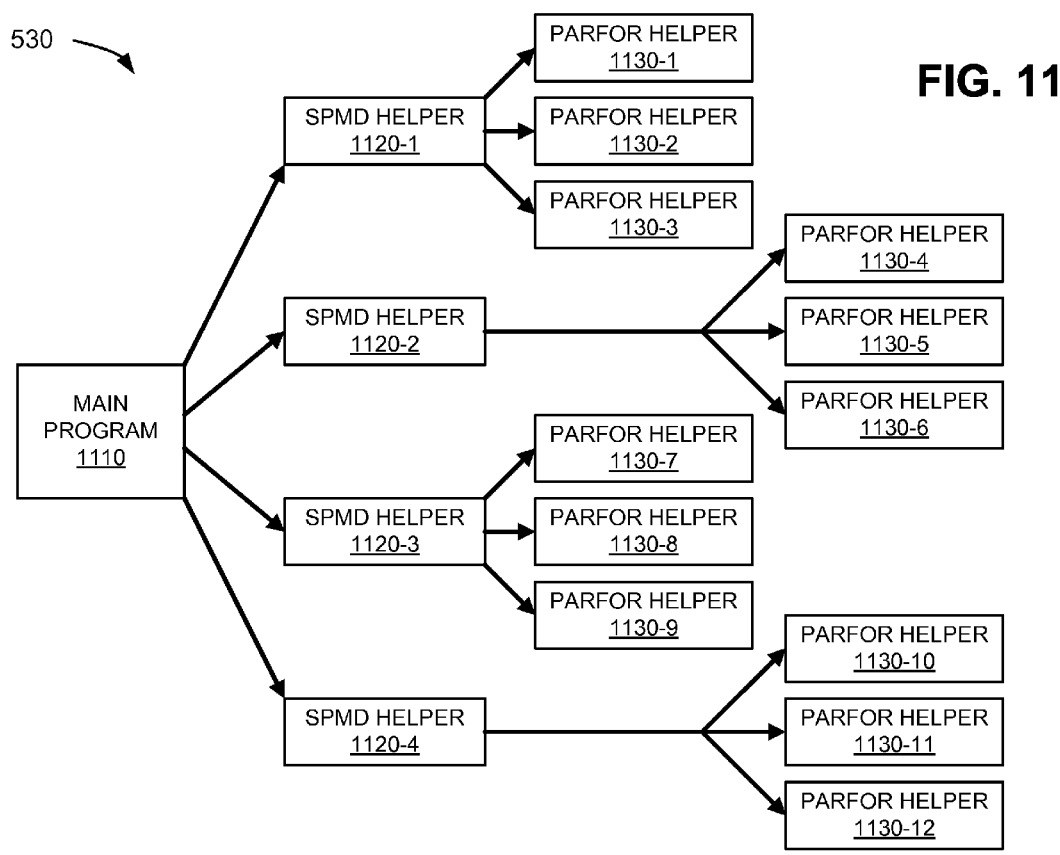
FIG. 11 depicts an exemplary operation of the resource allocation logic of the parallel program interfaces depicted in FIGS. 5A and 5B during nesting of parallel program constructs.

FIG. 11 depicts an exemplary operation of resource allocation logic 530 during nesting of parallel programming constructs (e.g., SPMD and PARFOR). A main program 1000 may be generated by client 500 (e.g., from program provider 510) and may be provided to resource allocation logic 530 according to the following syntax:

```
<compute an array A>
[B] = SPMD( A ) 4
    % in this block, A is divided by columns
    % up to 4 helpers can be used
    PARFOR (i=1:NROWS, 3)
        % compute on each row of the piece of A
        <computation>
    END
END
```

If sixteen or more resources (or helpers) are available, resource allocation logic 530 may use four helpers to handle each piece of the array A (e.g., broken by columns), and each helper may use three more helpers to execute the rows of the array A. Resource allocation logic 530 may allocate main program 1000 as depicted in FIG. 11, where each helper may be associated with a resource (e.g., software UEs 410 and/or labs 420, not shown).

As shown, resource allocation logic 530 may use four SPMD (single program, multiple data) helpers 1120-1, 1120-2, 1120-3, and 1120-4 (collectively SPMD helpers 1120) to handle each piece of the array A. Resource allocation logic 530 may cause each SPMD helper 1120 to use three helpers to execute the rows of the array A. For example, SPMD helper 1120-1 may use PARFOR helpers 1130-1, 1130-2, and 1130-3, SPMD helper 1120-2 may use PARFOR helpers 1130-4, 1130-5, and 1130-6, SPMD helper 1120-3 may use PARFOR helpers 1130-7, 1130-8, and 1130-9, and/or SPMD helper 1120-4 may use PARFOR helpers 1130-10, 1130-11, and 1130-12, respectively. Such an allocation may be produced by resource allocation logic 530 if there are more than sixteen resources available to resource allocation logic 530.

However, if there are fewer than eight resources available, resource allocation logic 530 may implement a variety of allocation strategies. For example, resource allocation logic 530 (e.g., using the user-controlled allocation strategy) may honor the first eight requests for resources or helpers. Such an arrangement may allocate the four SPMD helpers 1120, and may allocate from zero to three PARFOR helpers 1130 for each SPMD helper 1120, depending on the timing of the requests for resources. Resource allocation logic 530 (e.g., using the top-down allocation strategy) may allocate four resources as SPMD helpers 1120, and may guarantee that each SPMD helper 1120 may use one additional resource that it could allocate as a PARFOR helper 1130. Resource allocation logic 530 (e.g., using the dynamic allocation strategy) may operate like the user-controlled allocation strategy, but if the allocated PARFOR helpers 1130 become free, they would be available to satisfy any other unexecuted PARFOR helper requests. Resource allocation logic 530 (e.g., using the global allocation strategy) may provide the same results as the top-down allocation strategy. If processing of the four SPMD regions is radically different in time, resource allocation logic 530 (e.g., using the adaptive allocation strategy) may allocate more helpers to slower executing regions.

Although FIG. 11 shows exemplary operations of resource allocation logic 530, in other implementations, resource allocation logic 530 may include fewer, different, or additional operations than depicted in FIG. 11. In still other implementations, one or more operations of resource allocation logic 530 may perform the tasks performed by one or more other operations of resource allocation logic 530.

Exemplary Process

FIGS. 12-17 depict a flow chart of an exemplary process 1200 according to implementations described herein. In one implementation, process 1200 may be performed by client 500. In other implementations, process 1200 may be performed by other devices (e.g., client 500 in conjunction with web service 580).

Figure 12:
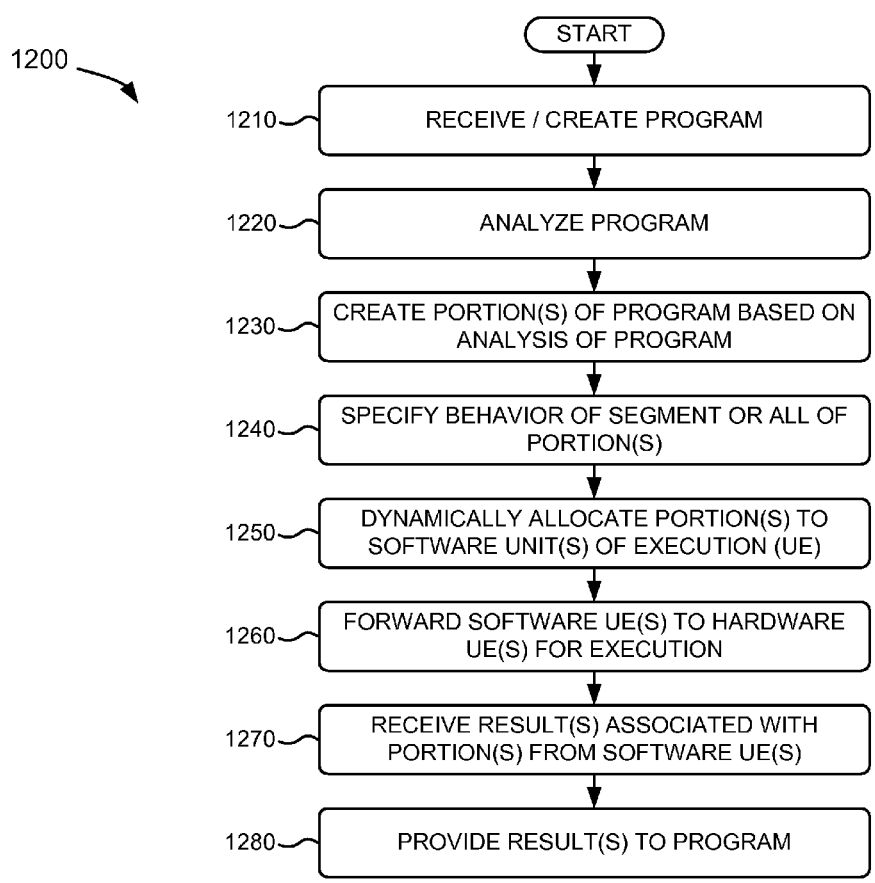
FIGS. 12-17 depict a flow chart of an exemplary process according to implementations described herein.

As shown in FIG. 12, process 1200 may begin with receipt or creation of a program (or main program) (block 1210). For example, in one implementation described above in connection with FIG. 5A, program provider 510 may include hardware and/or software based logic that provides one or more programs (e.g., main program 545) for execution. In one example, program provider 510 may generate or receive programs created using a technical computing environment.

The program may be analyzed (block 1220), and one or more program portions may be created or generated based on the analysis of the program (block 1230). For example, in one implementation described above in connection with FIG. 5A, analysis logic 520 of client 500 may include hardware and/or software based logic that analyzes main program 545 and parses main program 545 into one or more program portions 550. In one example, analysis logic 520 may include language constructs (as described above in connection with FIGS. 7-9) that parse main program 545 into one or more program portions 550.

As further shown in FIG. 12, a behavior of a portion or all of the one or more program portions may be specified (block 1240). For example, in one implementation described above in connection with FIG. 5A, analysis logic 520 may define a sub-group behavior for each of program portions 550. In one example, the sub-group behavior may relate to the parallel programming styles that may be employed on the group of program portions 550. In another example, analysis logic 520 may dynamically change the behavior of one or more of program portions 550 as code is executed for other program portions 550. In still another example, the sub-group behavior may include an unused state, a user-controlled UE state, a task parallel state, a SPMD state, a stream state, etc. Each program portion may be in one of the above-mentioned states, and may request other program portions to be placed in a new state. In a further example, some state information may be consistent across client 500 or some state information may be consistent across a sub-group of client 500.

Returning to FIG. 12, the one or more program portions may be dynamically allocated to one or more software units of execution (block 1250). For example, in one implementation described above in connection with FIG. 5A, resource allocation logic 530 of client 500 may receive program portions 550, and may include hardware and/or software based logic that dynamically allocates (as indicated by reference number 560) program portions 550 to one or more software UEs (e.g., software UE 410).

As shown in FIG. 12, the one or more software units of execution may be forwarded to one or more hardware units of execution for execution of the one or more program portions (block 1260). For example, in one implementation described above in connection with FIG. 5A, resource allocation logic 530 may forward the software UEs to one or more hardware UEs (e.g., hardware UE 200) for execution by hardware UEs in a parallel programming manner.

As further shown in FIG. 12, one or more results associated with the one or more program portions may be received from the one or more software units of execution (block 1270), and the one or more results may be provided to the program (block 1280). For example, in one implementation described above in connection with FIG. 5A, results provider 540 of client 500 may include hardware and/or software based logic that receives results 570 from the software UEs, and provides results 570 to program provider 510. In one example, results provider 540 may combine results 570 into a single result, and may provide the single result to program provider 510.

Figure 13:
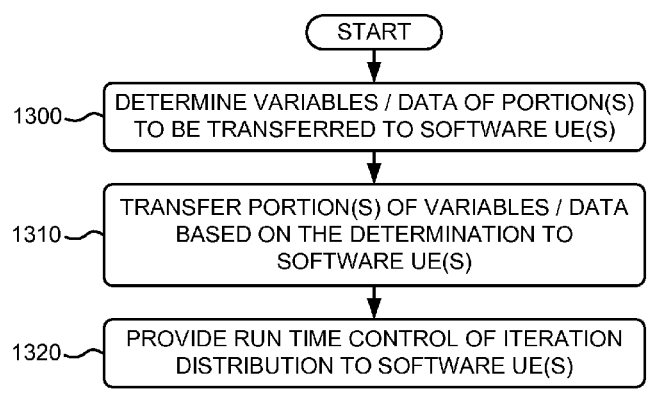

Process block 1220 may include the process blocks illustrated in FIG. 13. As shown in FIG. 13, process block 1220 may include determining variables and/or data associated with the one or more program portions to be transferred to the one or more software units of execution (block 1300), and transferring appropriate portions of variables and/or data based on the determination to the one or more software units of execution (block 1310). For example, in one implementation described above in connection with FIG. 5A, analysis logic 520 of client 500 may determine variables and/or data of program portions 550 to be transferred to software UE 410. Analysis logic 520 may transform program portions 550 and may transfer variables and/or data based on the determination of the variables and/or data.

As further shown in FIG. 13, process block 1220 may include providing run time control of iteration distribution to the one or more software units of execution (block 1320). For example, in one implementation described above in connection with FIG. 5A, analysis logic 520 may provide execution or run time control of how the iterations get allocated to software UE 410 (e.g., labs 420 of software UE 410). In one example, client 500 (via allocation logic 530) may use any of the allocation strategies described above in connection with FIG. 10 to provide run time control of iteration allocation.

Figure 14:
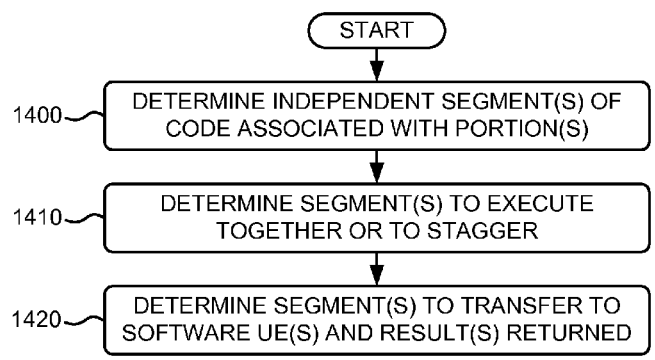

Alternatively and/or additionally, process block 1220 may include the process blocks illustrated in FIG. 14. As shown in FIG. 14, process block 1220 may include determining one or more independent segments of code associated with the one or more program portions (block 1400), and determining whether to execute the one or more segments together or in a staggered fashion (block 1410). For example, in one implementation described above in connection with FIG. 8, analysis logic 520 of client may determine independent segments or sections of code associated with program portions 550. In one example, analysis logic 520 may perform a dependency analysis on the sections of the code to determine independent sections. Analysis logic 520 may analyze PARSECTION command 800 and may determine sections of the code to be executed together and sections of the code that may undergo staggered execution.

As further shown in FIG. 14, process block 1220 may include determining which of the one or more segments to transfer to the software one or more units of execution and what results to be returned by the software one or more units of execution (block 1420). For example, in one implementation described above in connection with FIG. 8, analysis logic 520 may determine sections of the code to allocate to software UE 410 (e.g., labs 420 of software UE 410), and/or results to be returned at the end of PARSECTION command 800. For example, in one implementation, client 500 (via allocation logic 530) may use any of the allocation strategies described above in connection with FIG. 10 to provide run time control of code section allocation.

Figure 15:
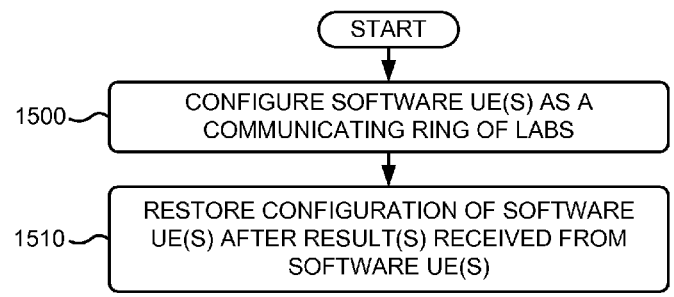

Alternatively and/or additionally, process block 1220 may include the process blocks illustrated in FIG. 15. As shown in FIG. 15, process block 1220 may include configuring the one or more software units of execution as a communication ring of one or more labs (block 1500). For example, in one implementation described above in connection with FIG. 9, SPMD command 900 may configure resources as a communicating ring of labs (e.g., ring of labs 420), which may mean that labs 420 may have a same number of labs (e.g., NUMLABS) 920 defined, each lab 420 may have a unique value (e.g., LABINDEX 930, 940, 950, and 960 for labs 420-1, 420-2, 420-3, 420-4, respectively) between one and NUMLABS 920, labs 420 may send data to and from one another, and/or each lab 420 may include a unique random number generator that creates random number streams independent of one another.

As further shown in FIG. 15, process block 1220 may include restoring configurations of the one or more software units of execution after the one or more results have been received from the software units of execution (block 1510). For example, in one implementation described above in connection with FIG. 9, upon completion of SPMD command 900, labs 420 may be "cleaned up," which may mean that labs 420 may be restored to ordinary resources (e.g., after the results are received), NUMLABS 920 and LABINDEX 930-940 may set back to one, the random number generators may be set back to a default start value, and/or workspaces may be cleared.

Figure 16:
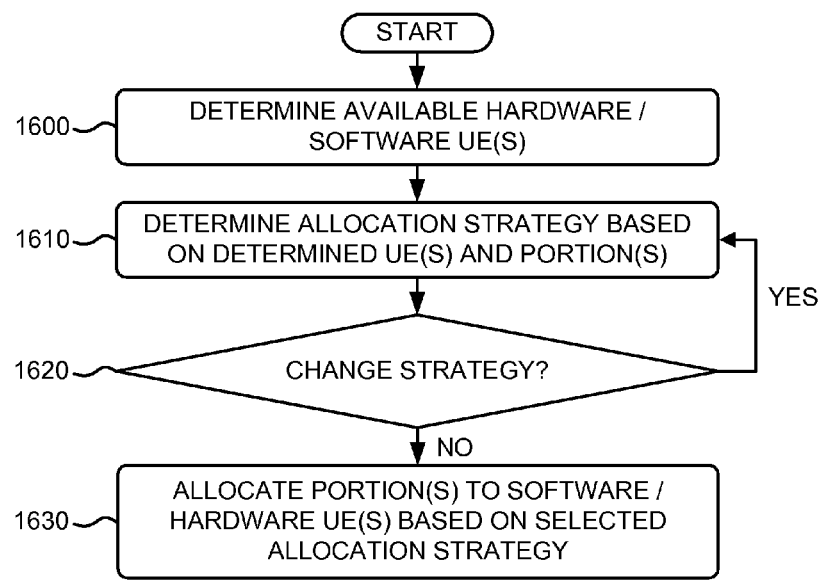

Process block 1250 may include the process blocks illustrated in FIG. 16. As shown in FIG. 16, process block 1250 may include determining available hardware and/or software units of execution (block 1600), and determining an allocation strategy based on the available hardware and/or software units of execution and the program portions (block 1610). For example, in one implementation described above in connection with FIG. 10, allocation selector logic 1000 may receive program portions 550 from analysis logic 520 and/or may determine available software UEs 410 and/or available hardware UEs 200 based on information 1080 indicating the availability of software UEs 410 and/or hardware UEs 200. Allocation selector logic 1000 may return a maximum number of resources (e.g., software UEs 410) available to simultaneously execute program portions 550. If allocation selector logic 1000 returns zero as the number, program portions 550 may be executed on the requesting device (e.g., client 500). Allocation selector logic 1000 may use available software UEs 410 and/or labs 420 to support many different parallel programming models. In one example, allocation selector logic 1000 may select an allocation strategy based on the determined software UEs 410 and/or labs 420 and/or based on program portions 550 (e.g., processing requirements of program portions 550). Allocation selector logic 1000 may select any of logic 1010-1060 for implementation of the allocation strategy.

As further shown in FIG. 16, process block 1250 may determine whether to change a selected allocation strategy (block 1620). If the allocation strategy is to be changed (block 1620—YES), then process block 1250 may return to process block 1610. If the allocation strategy is not to be changed (block 1620—NO), then process block 1250 may include allocating the one or more program portions to the one or more hardware and/or software units of execution based on the selected allocation strategy (block 1630). For example, in one implementation described above in connection with FIG. 10, allocation selector logic 1000 may determine whether to change a selected allocation strategy. If the allocation selector logic 1000 determines that the allocation strategy is to be changed, allocation selector logic 1000 may determine a different allocation strategy based on the determined software UEs 410 and/or labs 420 and/or based on program portions 550. If the allocation strategy is selected and/or determined, allocation selector logic 1000 may allocate one or more program portions 550 to one or more software UEs 410, and/or one or more labs 420.

Figure 17:
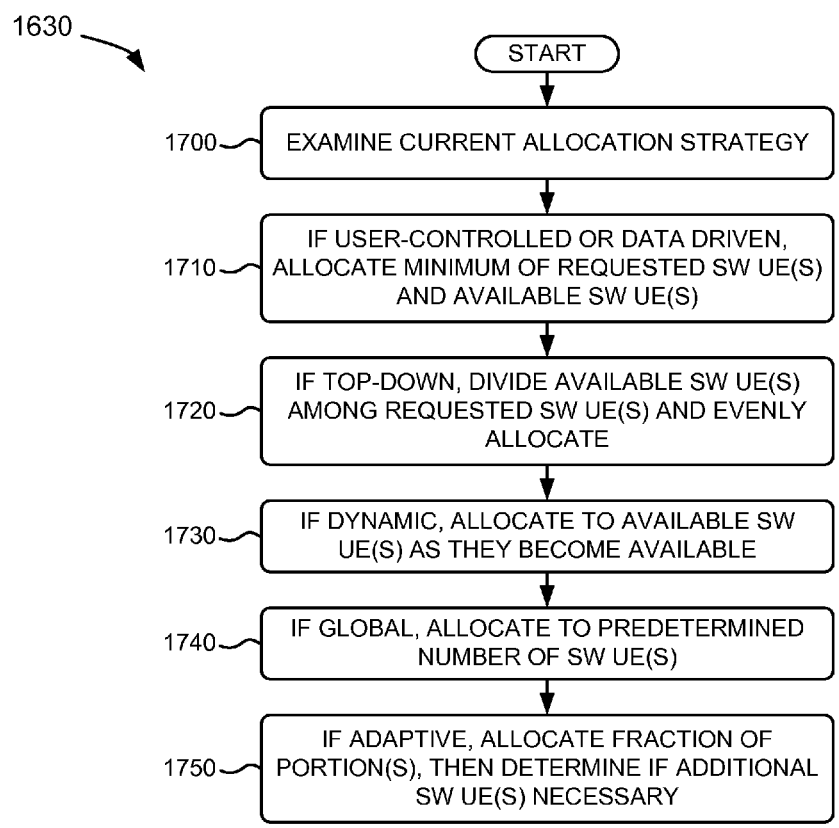

Process block 1630 may include the process blocks illustrated in FIG. 17. As shown in FIG. 17, process block 1630 may include examining a current allocation strategy (block 1700). For example, in one implementation described above in connection with FIG. 10, allocation selector logic 1000 may examine a current allocation strategy and may select one or more of logic 1010-1060 based on the current allocation strategy.

As further shown in FIG. 17, if a user-controlled or a data driven allocation strategy is the current strategy, then process block 1630 may include allocating a minimum number of requested software units of execution and/or available software units of execution for the one or more program portions (block 1710). For example, in one implementation described above in connection with FIG. 10, if allocation selector logic 1000 selects a user-controlled allocation strategy, user-controlled logic 1010 may be implemented and may permit a user to specify how many resources (e.g., software UEs 410 and/or labs 420) are to be allocated to each program portion 550. The allocation may be performed in a first come, first served manner. If allocation selector logic 1000 selects a data driven allocation strategy, data driven logic 1020 may be implemented and may provide (or receive from the user) a program that may review parameters supplied to a program portion and may compute an optimal number of resources (e.g., software UEs 410 and/or labs 420) to be used for the program portion. Alternatively, the program may specify resources to be allocated and/or criteria to guide the allocation. In one example, data user-controlled logic 1010 and/or driven logic 1020 may permit program portions 550 to use the minimum of a requested number of resources (e.g., software UEs 410 and/or labs 420) and an available number of resources.

Returning to FIG. 17, if a top-down allocation strategy is the current strategy, then process block 1630 may include dividing available software units of execution among requested software units of execution and/or evenly allocating the one or more program portions (block 1720). For example, in one implementation described above in connection with FIG. 10, if allocation selector logic 1000 selects a top-down allocation strategy, top-down logic 1030 may be implemented and may divide available resources (e.g., software UEs 410 and/or labs 420) among a number program portions 550 specified by a user (e.g., via client 500). In one example, top-down logic 1030 may divide the number of available resources by the requested number of program portions. If there are fewer resources than the requested number of program portions, top-down logic 1030 may return the number of available resources, and may allocate the program portions among the available resources. If there are more resources than the requested number of program portions, top-down logic 1030 may evenly allocate the program portions among the resources.

As further shown in FIG. 17, if a dynamic allocation strategy is the current strategy, then process block 1630 may include allocating the one or more program portions to available software units of execution as they become available (block 1730). For example, in one implementation described above in connection with FIG. 10, if allocation selector logic 1000 selects a dynamic allocation strategy, dynamic logic 1040 may be implemented and may take the number of program portions 550 to be an upper limit. If a program portion is complete, dynamic logic 1040 may determine what program portions need help, and may assign the program portions to the available resources. Dynamic logic 1040 may allocate program portions according to a priority queue, a round-robin algorithm, and/or any other strategy that precludes a program portion from waiting indefinitely for a resource.

Returning to FIG. 17, if a global allocation strategy is the current strategy, then process block 1630 may include allocating the one or more program portions to a predetermined number of software units of execution (block 1740). For example, in one implementation described above in connection with FIG. 10, if allocation selector logic 1000 selects a global allocation strategy, global logic 1050 may be implemented and may inspect an application associated with program portions 550, and may allocate resources to each parallel section of the application based on additional information (e.g., supplied by the user and/or models), heuristics determining where additional resources would be the most beneficial, etc.

As further shown in FIG. 17, if an adaptive allocation strategy is the current strategy, then process block 1630 may include allocating a fraction of the one or more program portions and then determining if additional software units of execution are needed (block 1750). For example, in one implementation described above in connection with FIG. 10, if allocation selector logic 1000 selects an adaptive allocation strategy, adaptive logic 1060 may be implemented and may allocate resources (e.g., software UEs 410 and/or labs 420) to program portions based on an amount of time each program portion may take for execution. Adaptive logic 1060 may dynamically determine the amount of time, and/or may derive the amount of time from data from previous executions of the software UE. In one example, adaptive logic 1060 may request that a portion of the program portions be completed, may calculate the time to execute the portion, and may determine whether to allocate additional resources to the program portions based on the calculated time.

CONCLUSION

Implementations described herein may provide a parallel programming interface for a program for execution. For example, in one implementation, the parallel programming interface may analyze the program, may generate one or more program portions based on the analysis of the program, and/or may specify a behavior of a segment and/or all of the one or more portions. The parallel programming interface may dynamically allocate the one or more portions to one or more software units of execution (UEs), and/or may forward the one or more software UEs to one or more hardware UEs for execution. The parallel programming interface may receive one or more results associated with the one or more portions from the software UEs, and may provide the one or more results to the program.

The foregoing description of implementations provides illustration and description, but is not intended to be exhaustive or to limit the invention to the precise form disclosed. Modifications and variations are possible in light of the above teachings or may be acquired from practice of the invention.

For example, while series of acts has been described with regard to FIGS. 14-19, the order of the acts may be modified in other implementations. Further, non-dependent acts may be performed in parallel.

Also, the term "user" has been used herein. The term "user" is intended to be broadly interpreted to include a client or a user of a client.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
   receiving a program, where the receiving of the program is performed by the computer device;
   analyzing the program, where the analyzing is performed by the computer device;
   generating one or more program portions based on the analysis of the program, where the generating is performed by the computer device;
   dynamically allocating the one or more program portions to two or more software units of execution for parallel programming, where the dynamically allocating is performed by the computer device, and where dynamically allocating the one or more program portions comprises:
      determining availability of the two or more software units of execution,
      selecting an allocation strategy based on the determined available software units of execution and the one or more program portions, and
      allocating the one or more program portions to the available software units of execution based on the selected allocation strategy;
   receiving one or more results associated with the one or more program portions from the two or more software units of execution, where the receiving of the one or more results is performed by the computer device; and
   providing the one or more results to the program, where the providing is performed by the computer device; where dynamically allocating the one or more program portions further comprises: changing the selected allocation strategy to a new allocation strategy; and
   allocating the one or more program portions to the available software units of execution based on the new allocation strategy.

2. The computing device-implemented method of claim 1, where allocating the one or more program portions to the available software units of execution based on the selected allocation strategy comprises:
   examining the selected allocation strategy;
   if the selected allocation strategy is user-controlled or data driven, allocating the one or more program portions to a minimum of requested software units of execution and available software units of execution;
   if the selected allocation strategy is top-down, allocating the one or more program portions evenly among the requested software units of execution;
   if the selected allocation strategy is dynamic, allocating the one or more program portions to available software units of execution;
   if the selected allocation strategy is global, allocating the one or more program portions to a predetermined number of software units of execution; and
   if the selected allocation strategy is adaptive, allocating a portion of the one or more program portions to the two or more software units of execution and determining if additional software units of execution are needed.

3. The computing device-implemented method of claim 1, where dynamically allocating the one or more program portions further comprises:
   determining variables or data associated with the one or more program portions and to be transferred to the two or more software units of execution;
   parsing the one or more program portions into the variables or data based on the determination; and
   providing execution time control of iteration distribution of the variables or data to the two or more software units of execution.

4. The computing device-implemented method of claim 1, where dynamically allocating the one or more program portions further comprises:
   determining independent segments of code associated with the one or more program portions;
   determining the independent segments of code to execute together or to execute in a staggered fashion;
   determining independent segments of code to transfer to the two or more software units of execution; and
   determining the one or more results to be returned by the software one or more units of execution based on execution of the transferred independent segments of code.

5. The computing device-implemented method of claim 1, where dynamically allocating the one or more program portions further comprises:
   configuring the two or more software units of execution as a communication ring of one or more labs.

6. A non-transitory computer-readable medium that stores computer-executable instructions for:
   creating a program;
   analyzing the program;
   generating a plurality of program portions based on the analysis of the program;
   dynamically allocating the plurality of program portions to a plurality of software units of execution for parallel programming, where the one or more instructions for dynamically allocating the plurality of program portions comprises one or more instructions for:
      determining availability of the plurality of software units of execution,
      selecting an allocation strategy based on the determined available software units of execution and the plurality of program portions, and
      allocating the plurality of program portions to the available software units of execution based on the selected allocation strategy;
   receiving a plurality of results associated with the plurality of program portions from the plurality of software units of execution; and
   providing the plurality of results or a single result based on the plurality of results to the program; where the one or more instructions for dynamically allocating the plurality of program portions further comprises one or more instructions for:
   changing the selected allocation strategy to a new allocation strategy; and allocating the plurality of program portions to the available software units of execution based on the new allocation strategy.

7. The computer-readable medium of claim 6, further comprising one or more instructions for:
using control and data passing layers to specify a current behavior of the plurality of software units of execution.

8. The computer-readable medium of claim 7, where the one or more instructions for using control and data passing layers comprises one or more instructions for:
using the control and data passing layers to enable communication among the plurality of software units of execution.

9. The computer-readable medium of claim 6, further comprising one or more instructions:
specifying a behavior of the plurality of program portions.

10. The computer-readable medium of claim 9, wherein where the one or more instructions for specifying a behavior comprises one or more instructions for:
defining a sub-group behavior for the plurality of program portions, the sub-group behavior relating to parallel programming styles employed on the plurality of program portions.

11. The computer-readable medium of claim 6, where the one or more instructions for generating a plurality of program portions comprises one or more instructions for:
parsing the program into the plurality of program portions.

12. The computer-readable medium of claim 6, where the one or more instructions for allocating the plurality of program portions to the available software units of execution comprises instructions for:
examining the selected allocation strategy;
if the selected allocation strategy is user-controlled or data driven, allocating the plurality of program portions to a minimum of requested software units of execution and available software units of execution;
if the selected allocation strategy is top-down, allocating the plurality of program portions evenly among the requested software units of execution;
if the selected allocation strategy is dynamic, allocating the plurality of program portions to available software units of execution;
if the selected allocation strategy is global, allocating the plurality of program portions to a predetermined number of software units of execution; and
if the selected allocation strategy is adaptive, allocating a portion of the plurality of tasks to the plurality of software units of execution and determining if additional software units of execution are needed.

13. The computer-readable medium of claim 6, where the one or more instructions for dynamically allocating the plurality of program portions comprises one or more instructions for:
determining variables or data associated with the plurality of program portions and to be transferred to the plurality of software units of execution;
parsing the plurality of program portions into the variables or data based on the determination; and
providing execution time control of iteration distribution of the variables or data to the plurality of software units of execution.

14. The computer-readable medium of claim 6, where the one or more instructions for dynamically allocating the plurality of program portions comprises one or more instructions for:
determining independent segments of code associated with the plurality of program portions;
determining the independent segments of code to execute together or to execute in a staggered fashion;
determining independent segments of code to transfer to the plurality of software units of execution; and
determining the plurality of results to be returned by the plurality of software units of execution based on execution of the transferred independent segments of code.

15. The computer-readable medium of claim 6, where the one or more instructions for dynamically allocating the plurality of program portions comprises one or more instructions for:
configuring the plurality of software units of execution as a communication ring of labs.

16. The computer-readable medium of claim 6, further comprising one or more instructions for:
combining the plurality of results into a single result; and
providing the single result to the program.

17. The computer-readable medium of claim 6, where the one or more instructions for analyzing the program comprises one or more instructions for:
performing a static analysis of the program.

18. The computer-readable medium of claim 6, where the one or more instructions for analyzing the program comprises one or more instructions for:
performing a runtime analysis of the program.

19. The computer-readable medium of claim 6, where the one or more instructions for dynamically allocating the one or more program portions comprises one or more instructions for:
dynamically allocating the one or more program portions during processing of the program.

20. The computer-readable medium of claim 6, further comprising one or more instructions for:
initiating the program on a client software unit of execution; and
dynamically allocating the plurality of program portions to a plurality of software units of execution for parallel programming via the client software unit of execution.

21. A non-transitory computer-readable medium that stores computer-executable instructions for:
providing a web service that:
receives a program,
analyzes the program,
generates one or more program portions based on the analysis of the program,
dynamically allocates the one or more program portions to a plurality of software units of execution for parallel programming,
receives one or more results associated with the one or more program portions from the plurality of software units of execution, and
provides the one or more results to the program; where the one or more instructions for dynamically allocating the plurality of program portions further comprises one or more instructions for: changing the selected allocation strategy to a new allocation strategy; and
allocating the plurality of program portions to the available software units of execution based on the new allocation strategy.

22. A non-transitory computer-readable medium that stores computer-executable instructions for:
creating a program;
generating a plurality of program portions based on a parallel programming construct of the program;
initiating the program on a client software unit of execution;

dynamically allocating the plurality of program portions to a plurality of software units of execution for parallel programming, where the one or more instructions for dynamically allocating the plurality of program portions comprises one or more instructions for:
  determining availability of the plurality of software units of execution,
  selecting an allocation strategy based on the determined available software units of execution and the plurality of program portions, and
  allocating the plurality of program portions to the available software units of execution based on the selected allocation strategy;
receiving a plurality of results associated with the plurality of program portions from the plurality of software units of execution; and
providing the plurality of results or a single result based on the plurality of results to the program;
where the one or more instructions for generating a plurality of program portions based on a parallel programming construct of the program further comprises one or more instructions for:
  permitting any data to manually or automatically allocated to and received from the plurality of software units of execution.

23. The computer-readable medium of claim 22, where the one or more instructions for generating a plurality of program portions based on a parallel programming construct of the program further comprises one or more instructions for:
  receiving a selection from a user related to permitting persistence or not permitting persistence; and
  generating a plurality of program portions based on the selection.

24. The computer-readable medium of claim 22, where the one or more instructions for generating a plurality of program portions based on a parallel programming construct of the program further comprises one or more instructions for:
  permitting a state to be set or reset when initially calling and when exiting the parallel programming construct.

25. The computer-readable medium of claim 22, where the one or more instructions for generating a plurality of program portions based on a parallel programming construct of the program further comprises one or more instructions for at least one of:
  permitting a distributed array to be redistributed based on a number of the plurality of software units of execution inside and outside the parallel programming construct;
  passing a reference to the distributed array; or
  distributing and gathering distributed arrays going inside and outside the parallel programming constructs.

26. The computer-readable medium of claim 22, where the one or more instructions for generating a plurality of program portions based on a parallel programming construct of the program further comprises one or more instructions for:
  including a parallel for loop (PARFOR) command in the program as the parallel programming construct, the PARFOR command comprising a general form of:
  PARFOR (variable=expr), statement, . . . , statement.

27. The computer-readable medium of claim 22, where the one or more instructions for generating a plurality of program portions based on a parallel programming construct of the program further comprises one or more instructions for:
  including a parallel section (PARSECTION) command in the program as the parallel programming construct, the PARSECTION command comprising a general form of:
  PARSECTION, section . . . , . . . .

28. The computer-readable medium of claim 22, where the one or more instructions for generating a plurality of program portions based on a parallel programming construct of the program further comprises one or more instructions for:
  including a single program, multiple data (SPMD) command in the program as the parallel programming construct, the SPMD command comprising a general form of:
  SPMD, statement, . . . , statement.

29. A non-transitory computer-readable medium that stores computer-executable instructions for:
  creating a program; and
  providing a parallel programming application program interface (API) for permitting customizable parallelism of the program, where permitting customizable parallelism of program includes:
    analyzing the program,
    generating a plurality of program portions based on the analysis of the program,
    dynamically allocating the plurality of program portions to the plurality of software units of execution for parallel programming,
    receiving a plurality of results associated with the plurality of program portions from the plurality of software units of execution, and
    providing the plurality of results or a single result based on the plurality of results to the program;
    where the one or more instructions for generating a plurality of program portions based on a parallel programming construct of the program further comprises one or more instructions for:
      permitting any data to manually or automatically allocated to and received from the plurality of software units of execution.

30. The computer-readable medium of claim 29, where the one or more instructions for providing a parallel programming application program interface (API) comprises one or more instructions for:
  nesting the parallel programming API in a parallel programming construct.

31. The computer-readable medium of claim 30, where the parallel programming construct comprises at least one of a PARFOR command, a PARSECTION command, or a single program, multiple data (SPMD) command.

* * * * *

UNITED STATES PATENT AND TRADEMARK OFFICE
CERTIFICATE OF CORRECTION

Page 1 of 1

PATENT NO.         : 8,010,954 B2
APPLICATION NO.    : 11/748938
DATED              : August 30, 2011
INVENTOR(S)        : John N. Little et al.

It is certified that error appears in the above-identified patent and that said Letters Patent is hereby corrected as shown below:

Column 31, claim 10, line 17, delete the word "wherein".

Signed and Sealed this
Eighteenth Day of October, 2011

David J. Kappos
*Director of the United States Patent and Trademark Office*